US012309823B2

(12) United States Patent
Ibrahim et al.

(10) Patent No.: US 12,309,823 B2
(45) Date of Patent: May 20, 2025

(54) CHANNEL STATE INFORMATION REFERENCE RESOURCE DEFINITION IN FULL-DUPLEX COMMUNICATION MODES

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 17/808,907

(22) Filed: Jun. 24, 2022

(65) Prior Publication Data
US 2023/0422283 A1    Dec. 28, 2023

(51) Int. Cl.
*H04W 72/542*    (2023.01)
*H04L 1/00*    (2006.01)
(Continued)

(52) U.S. Cl.
CPC ......... *H04W 72/542* (2023.01); *H04L 1/0025* (2013.01); *H04L 5/0051* (2013.01);
(Continued)

(58) Field of Classification Search
CPC .............. H04W 72/542; H04W 72/23; H04W 72/0453; H04W 72/1268; H04L 1/0025; H04L 5/0051; H04L 5/14; H04L 1/0026; H04L 25/0202; H04L 5/005; H04L 5/0057; H04B 7/0632
See application file for complete search history.

(56) References Cited

U.S. PATENT DOCUMENTS

2017/0054544 A1*    2/2017    Kazmi .................. H04L 5/14
2017/0086195 A1*    3/2017    Yum ................. H04L 5/0048
(Continued)

FOREIGN PATENT DOCUMENTS

WO    WO-2020248218 A1    12/2020
WO    WO-2021228211 A1    11/2021

OTHER PUBLICATIONS

WO 2020/215105 A2 (Year: 2020).*
Ericsson: "Way Forward on UE/BS Demodulation Performance for Additional MTC Enhancements For LTE", 3GPP TSG-RAN WG4 Meeting #94-e-Bis, R4-2005513, 3rd Generation Partnership Project, Mobile Competence Centre, 650, Route Des Lucioles, F-06921 Sophia-Antipolis Cedex, France, vol. RAN WG4, No. e Meeting, Apr. 20, 2020-Apr. 30, 2020, May 4, 2020, pp. 1-4, XP052408398, Section. 3.1.
(Continued)

*Primary Examiner* — Rushil P. Sampat
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, a configuration for a channel state information (CSI) report associated with one or more CSI reference signal (CSI-RS) resources. The UE may determine a duplex mode associated with the CSI report. The UE may obtain one or more measurements of a CSI reference resource of the one or more CSI-RS resources based at least in part on the duplex mode associated with the CSI report. The UE may transmit, to the network node, the CSI report based at least in part on the one or more measurements of the CSI reference resource. Numerous other aspects are described.

30 Claims, 13 Drawing Sheets

(51) Int. Cl.
   *H04L 5/00*      (2006.01)
   *H04L 5/14*      (2006.01)
   *H04W 72/0453*   (2023.01)
   *H04W 72/23*     (2023.01)

(52) U.S. Cl.
   CPC ........... *H04L 5/14* (2013.01); *H04W 72/0453* (2013.01); *H04W 72/23* (2023.01)

(56) References Cited

U.S. PATENT DOCUMENTS

2020/0067573 A1* 2/2020 Kuchi .................. H04L 5/0053
2022/0141852 A1* 5/2022 Zhang ................. H04B 7/0632
                                                          370/329
2023/0180034 A1* 6/2023 Liu ....................... H04W 24/08
                                                          370/252

OTHER PUBLICATIONS

International Search Report and Written Opinion—PCT/US2023/023735—ISA/EPO—Sep. 29, 2023.
Zte et al., "Discussion on Measurement and RS Design for CLI Mitigation", 3GPP TSG RAN WG1 AH_NR#1 Meeting, R1-1700271, 3rd Generation Partnership Project, Mobile Competence Centre, 650, Route Des Lucioles, F-06921 Sophia-Antipolis Cedex, vol. Ran WG1, No. Spokane, Wa, Jan. 16, 2017-Jan. 20,2017, Jan. 16, 2017, XP051207809, pp. 1-8, Section 3, Sections 3.2-3.3, Sections 3.1, B, paragraphs [04.2], [04.3].
Co-pending U.S. Appl. No. 17/997,528, inventor Abdelghaffar; Muhammad, filed on Oct. 28, 2022.

* cited by examiner

CHANNEL STATE INFORMATION REFERENCE RESOURCE DEFINITION IN FULL-DUPLEX COMMUNICATION MODES

FIELD OF THE DISCLOSURE

Aspects of the present disclosure generally relate to wireless communication and to techniques and apparatuses associated with a channel state information (CSI) reference resource definition in full-duplex communication modes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some cases, one or more channel state information (CSI) parameters that are included in a CSI report are calculated based on a hypothetical data transmission scheduled in a "CSI reference resource." For example, in a frequency domain, a CSI reference resource for a serving cell is defined by a group of downlink physical resource blocks that correspond to a band to which derived CSI relates. In a time domain, the CSI reference resource defines a reference downlink slot number as a timing reference for determining the end of a measurement window for a CSI report (e.g., a CSI report should not include any channel and/or interference measurements obtained after the reference downlink slot number). Furthermore, the CSI reference resource typically defines various properties for the hypothetical data transmission used to calculate the CSI parameters (e.g., a reference signal overhead, bandwidth, and/or precoding, among other examples). For example, in cases where a user equipment (UE) is configured to report one or more CSI parameters based on a hypothetical data transmission in the CSI reference resource, the UE generally assumes, among other things, that a bandwidth is as configured for a corresponding CSI parameter and that no resource elements (REs) are allocated to a zero-power (ZP) CSI reference signal (CSI-RS).

However, in cases where a UE is configured to communicate in a full-duplexing mode, one or more assumptions regarding the CSI reference resource may not hold. For example, as described above, the UE typically assumes that the bandwidth of the CSI reference resource is the same as configured for a corresponding CSI parameter, and further assumes that no REs are allocated for a ZP CSI-RS used for rate-matching. Accordingly, because a sub-band full-duplexing (SBFD) mode is associated with non-contiguous downlink frequency resources, there may be a need to adapt a CSI-RS resource configuration for full-duplex communication (e.g., because a portion of the bandwidth is not available for downlink). For example, in an SBFD mode associated with non-contiguous downlink frequency resources, a CSI report may be linked to two disjoint CSI-RS resources (e.g., a first CSI-RS resource in a first sub-band and a second CSI-RS resource in a second sub-band), or a CSI report may be linked to one non-contiguous CSI-RS resource that may be defined with a start and ending resource block or based on a bitmap. Accordingly, because a CSI reference resource is generally used to carry a hypothetical downlink data transmission, some aspects described herein relate to a CSI reference resource definition that may be based on one or more non-contiguous resource allocations that may be used for a downlink data transmission and/or an uplink data transmission in an SBFD slot, where a middle frequency region is used for uplink-only.

For example, in some aspects, a downlink and/or uplink data transmission may be associated with a configuration that explicitly defines a disjoint frequency domain resource. In such cases, there may be a frequency domain resource allocation (FDRA) specific to SBFD slots, which may use a bitmap or two start and length indicators to explicitly define the disjoint frequency domain resource. For example, the FDRA may map the data transmission to the resource blocks that are available for downlink in SBFD slots. Alternatively, a non-contiguous frequency domain allocation may be based on a continuous data allocation that spans the entire bandwidth part, and a rate-matching pattern is defined to achieve the non-contiguous frequency domain allocation. In this case, one or more ZP CSI-RS resources are defined to rate match around the uplink sub-band (e.g., the one or more ZP CSI-RS resources include time and frequency resources in which no signal is transmitted). In this way, combining the contiguous resource allocation with the rate-matching pattern removes the uplink frequency region from the contiguous resource allocation, resulting in the non-contiguous frequency domain allocation to be used in SBFD slots. Furthermore, some aspects described herein relate to techniques to indicate a duplex mode of a CSI report (e.g., using a non-contiguous frequency domain allocation), to relate a CSI report to a CSI-RS configuration, and/or to configure a CSI reference resource for different duplex modes.

Some aspects described herein relate to a UE for wireless communication. The UE may include a memory and one or more processors coupled to the memory. The one or more processors may be configured to receive, from a network node, a configuration for a CSI report associated with one or more CSI-RS resources. The one or more processors may be configured to determine a duplex mode associated with the CSI report. The one or more processors may be configured to obtain one or more measurements of a CSI reference resource of the one or more CSI-RS resources based at least in part on the duplex mode associated with the CSI report. The one or more processors may be configured to transmit, to the network node, the CSI report based at least in part on the one or more measurements of the CSI reference resource.

Some aspects described herein relate to a network node for wireless communication. The network node may include a memory and one or more processors coupled to the memory. The one or more processors may be configured to transmit, to a UE, a configuration for a CSI report associated with one or more CSI-RS resources, wherein the CSI report is associated with a duplex mode. The one or more processors may be configured to receive, from the UE, a CSI report based at least in part on one or more measurements of a CSI reference resource associated with the duplex mode.

Some aspects described herein relate to a method of wireless communication performed by a UE. The method may include receiving, from a network node, a configuration for a CSI report associated with one or more CSI-RS resources. The method may include determining a duplex mode associated with the CSI report. The method may include obtaining one or more measurements of a CSI reference resource of the one or more CSI-RS resources based at least in part on the duplex mode associated with the CSI report. The method may include transmitting, to the network node, the CSI report based at least in part on the one or more measurements of the CSI reference resource.

Some aspects described herein relate to a method of wireless communication performed by a network node. The method may include transmitting, to a UE, a configuration for a CSI report associated with one or more CSI-RS resources, wherein the CSI report is associated with a duplex mode. The method may include receiving, from the UE, a CSI report based at least in part on one or more measurements of a CSI reference resource associated with the duplex mode.

Some aspects described herein relate to a non-transitory computer-readable medium that stores a set of instructions for wireless communication by a UE. The set of instructions, when executed by one or more processors of the UE, may cause the UE to receive, from a network node, a configuration for a CSI report associated with one or more CSI-RS resources. The set of instructions, when executed by one or more processors of the UE, may cause the UE to determine a duplex mode associated with the CSI report. The set of instructions, when executed by one or more processors of the UE, may cause the UE to obtain one or more measurements of a CSI reference resource of the one or more CSI-RS resources based at least in part on the duplex mode associated with the CSI report. The set of instructions, when executed by one or more processors of the UE, may cause the UE to transmit, to the network node, the CSI report based at least in part on the one or more measurements of the CSI reference resource.

Some aspects described herein relate to a non-transitory computer-readable medium that stores a set of instructions for wireless communication by a network node. The set of instructions, when executed by one or more processors of the network node, may cause the network node to transmit, to a UE, a configuration for a CSI report associated with one or more CSI-RS resources, wherein the CSI report is associated with a duplex mode. The set of instructions, when executed by one or more processors of the network node, may cause the network node to receive, from the UE, a CSI report based at least in part on one or more measurements of a CSI reference resource associated with the duplex mode.

Some aspects described herein relate to an apparatus for wireless communication. The apparatus may include means for receiving, from a network node, a configuration for a CSI report associated with one or more CSI-RS resources. The apparatus may include means for determining a duplex mode associated with the CSI report. The apparatus may include means for obtaining one or more measurements of a CSI reference resource of the one or more CSI-RS resources based at least in part on the duplex mode associated with the CSI report. The apparatus may include means for transmitting, to the network node, the CSI report based at least in part on the one or more measurements of the CSI reference resource.

Some aspects described herein relate to an apparatus for wireless communication. The apparatus may include means for transmitting, to a UE, a configuration for a CSI report associated with one or more CSI-RS resources, wherein the CSI report is associated with a duplex mode. The apparatus may include means for receiving, from the UE, a CSI report based at least in part on one or more measurements of a CSI reference resource associated with the duplex mode.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
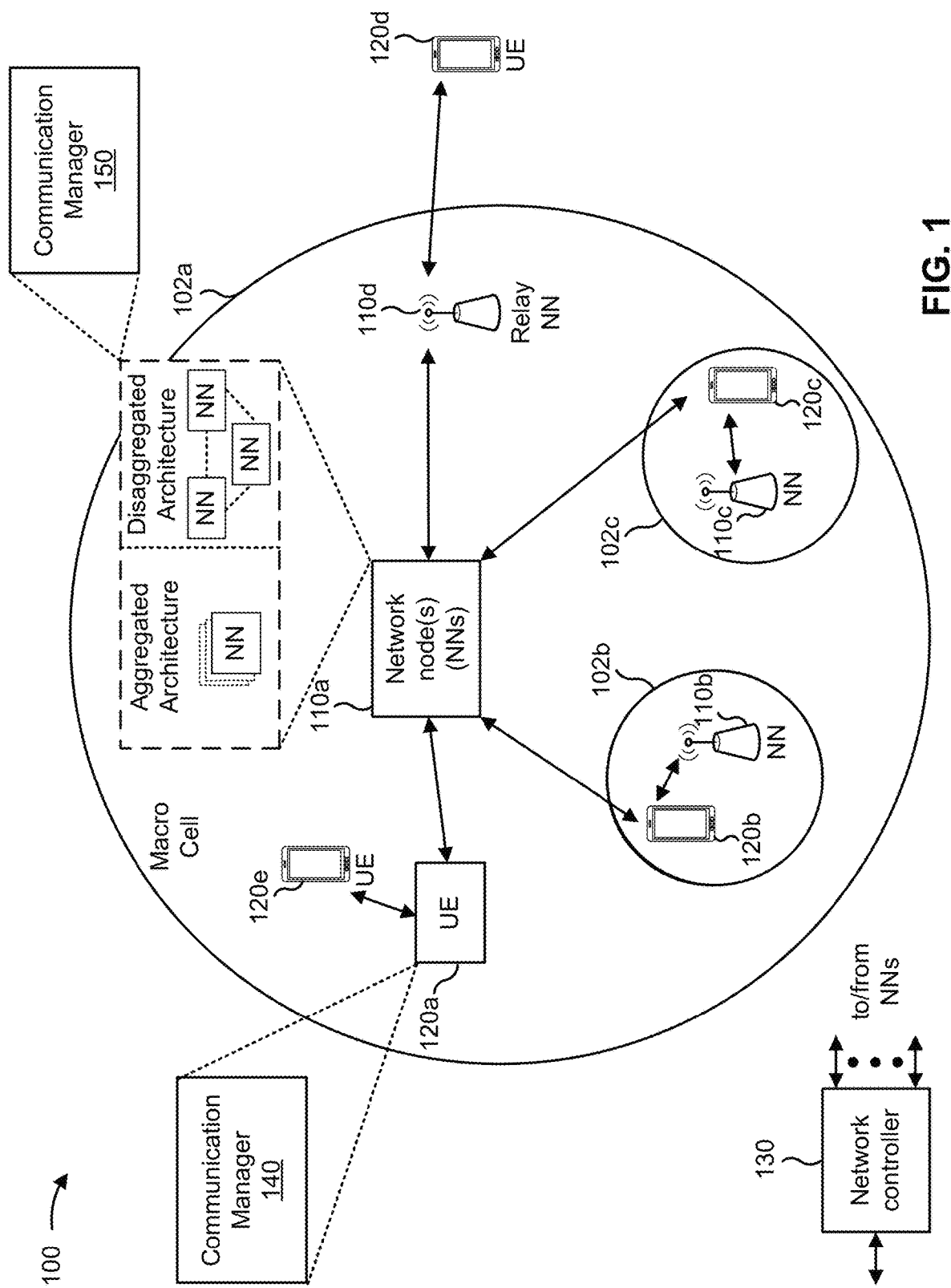
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node 110, a configuration for a channel state information (CSI) report associated with one or more CSI reference signal (CSI-RS) resources; determine a duplex mode associated with the CSI report; obtain one or more measurements of a CSI reference resource of the one or more CSI-RS resources based at least in part on the duplex mode associated with the CSI report; and transmit, to the network node 110, the CSI report based at least in part on the one or more measurements of the CSI reference resource. Additionally, or alternatively, the communication manager 140 may perform one or more other operations described herein.

In some aspects, the network node 110 may include a communication manager 150. As described in more detail elsewhere herein, the communication manager 150 may transmit, to a UE 120, a configuration for a CSI report associated with one or more CSI-RS resources, wherein the CSI report is associated with a duplex mode; and receive, from the UE 120, a CSI report based at least in part on one or more measurements of a CSI reference resource associated with the duplex mode. Additionally, or alternatively, the communication manager 150 may perform one or more other operations described herein.

As indicated above, FIG. 1 is provided as an example. Other examples may differ from what is described with regard to FIG. 1.

Figure 2:
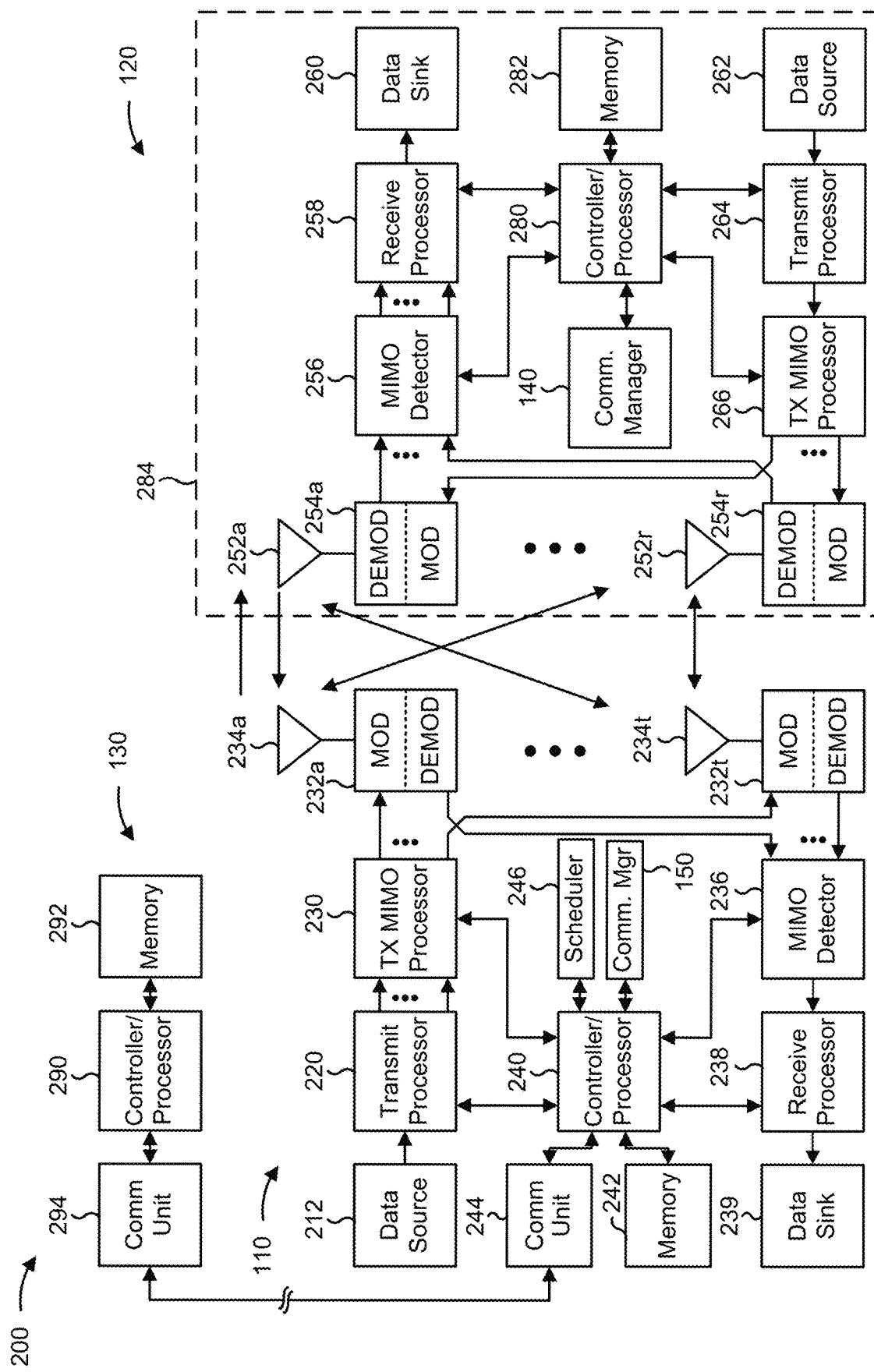
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-13).

The controller/processor 240 of the network node 110, the controller/processor 280 of the UE 120, and/or any other component(s) of FIG. 2 may perform one or more techniques associated with a CSI reference resource definition for full-duplex communication modes, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE 120 includes means for receiving, from a network node 110, a configuration for a CSI report associated with one or more CSI-RS resources; means for determining a duplex mode associated with the CSI report; means for obtaining one or more measurements of a CSI reference resource of the one or more CSI-RS resources based at least in part on the duplex mode associated with the CSI report; and/or means for transmitting, to the network node 110, the CSI report based at least in part on the one or more measurements of the CSI reference resource. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to a UE 120, a configuration for a CSI report associated with one or more CSI-RS resources, wherein the CSI report is associated with a duplex mode; and/or means for receiving, from the UE 120, a CSI report based at least in part on one or more measurements of a CSI reference resource associated with the duplex mode. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
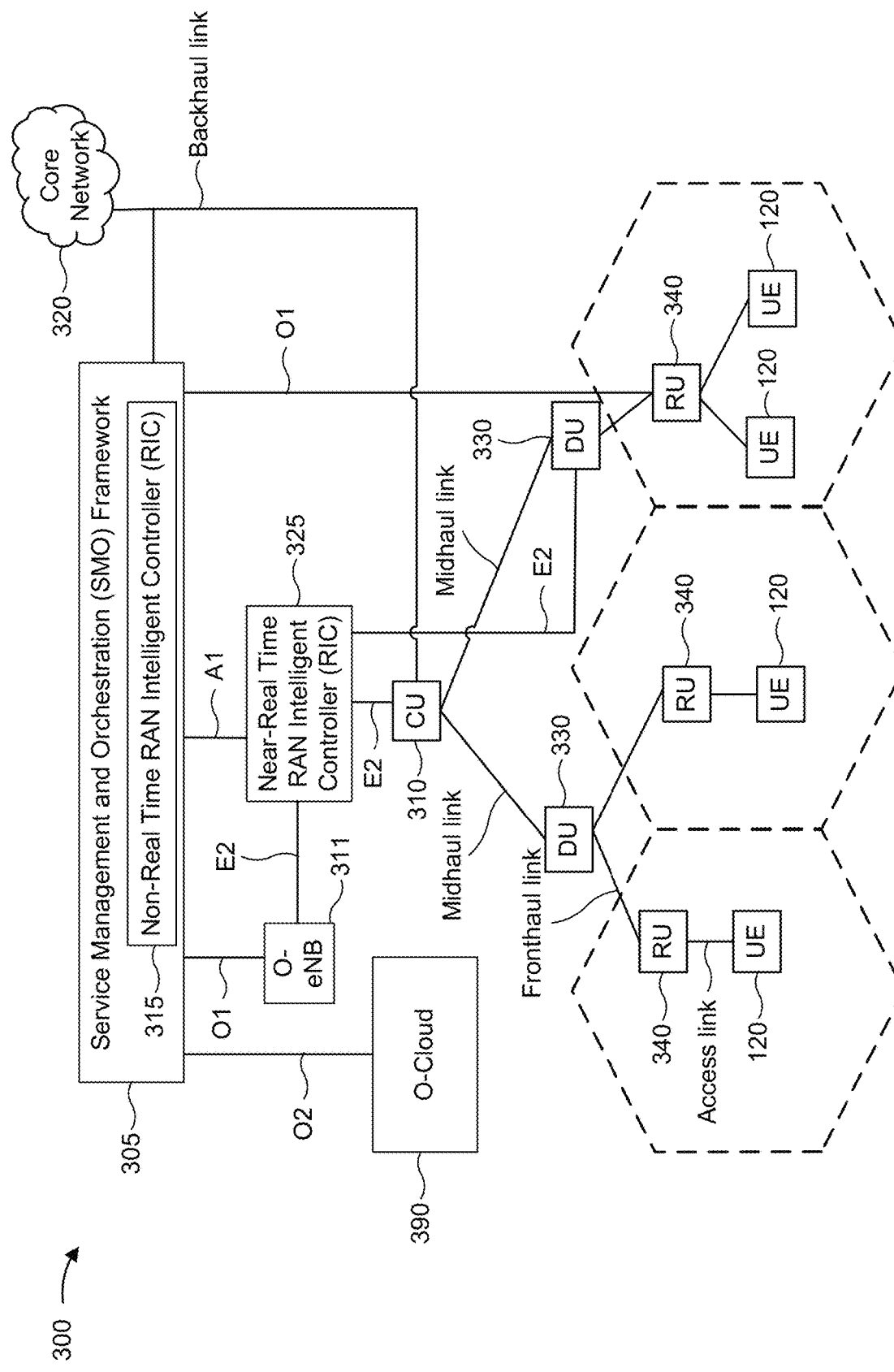
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT MC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as AI interface policies).

As indicated above, FIG. 3 is provided as an example. Other examples may differ from what is described with regard to FIG. 3.

Figure 4:
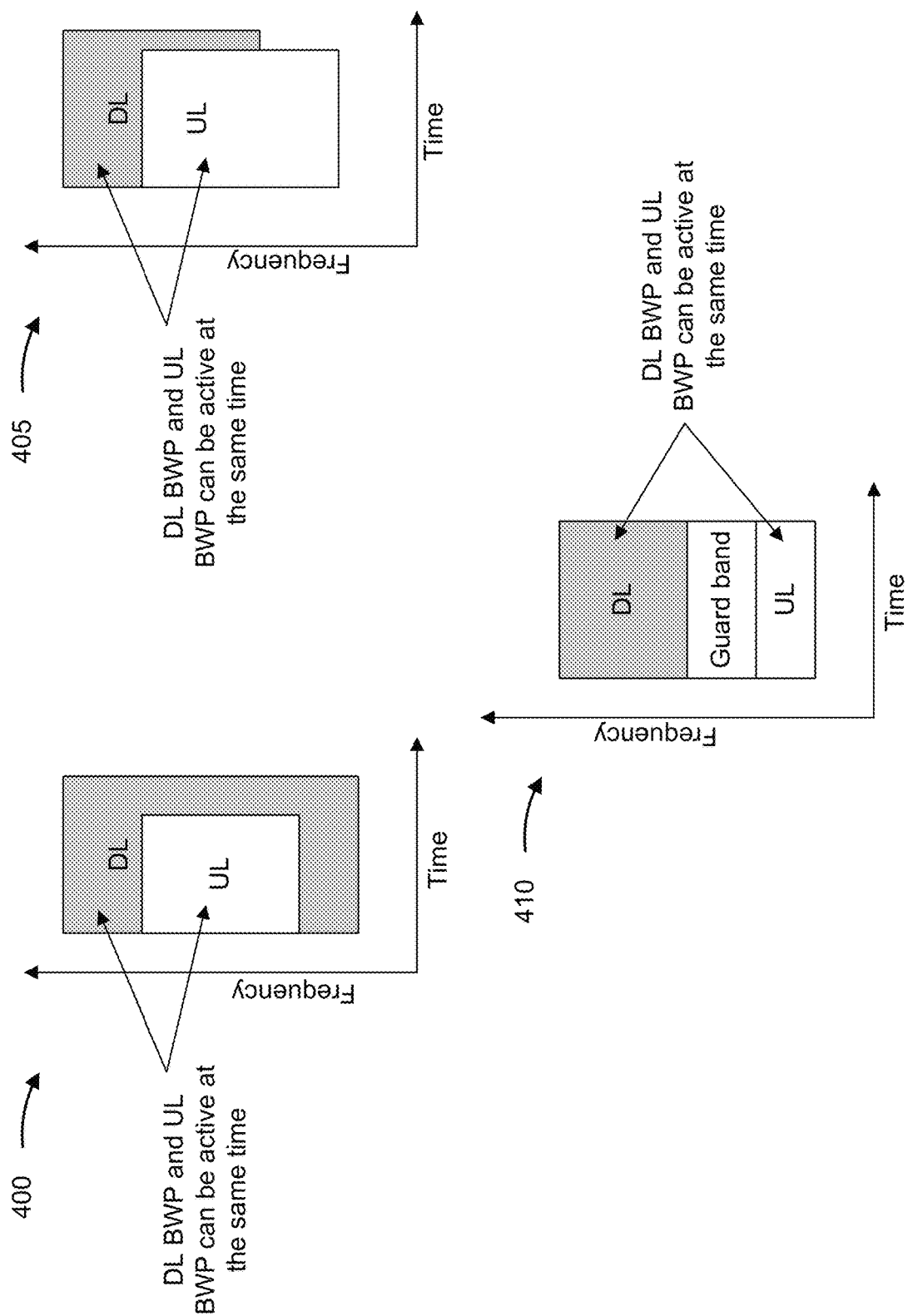
FIG. 4 is a diagram illustrating examples of full-duplex communication in a wireless network, in accordance with the present disclosure.

FIG. 4 is a diagram illustrating examples 400, 405, and 410 of full-duplex communication in a wireless network, in accordance with the present disclosure. As described herein, "full-duplex communication" refers to simultaneous uplink and downlink communication in a wireless network, which may be a capability of a UE, a network node, or another suitable device. For example, a UE operating in a full-duplex mode may transmit an uplink communication and receive a downlink communication at the same time (e.g., in the same slot or the same symbol), a network node operating in a full-duplex mode may receive an uplink communication and transmit a downlink communication at the same time, or the like. "Half-duplex communication" in a wireless network refers to unidirectional communications (e.g., only downlink communication or only uplink communication) at a given time (e.g., a device only transmits or only receives in a given slot or a given symbol).

As shown in FIG. 4, examples 400 and 405 show examples of in-band full-duplex (IBFD) communication. In IBFD, a UE may transmit an uplink communication to a network node and receive a downlink communication from the network node on the same time and frequency resources. As shown in example 400, in a first example of IBFD, the time and frequency resources for uplink communication may fully overlap with the time and frequency resources for downlink communication (e.g., all time and frequency resources allocated to uplink communication are also available for downlink communication). As shown in example 405, in a second example of IBFD, the time and frequency resources for uplink communication may partially overlap with the time and frequency resources for downlink communication (e.g., some time and frequency resources are reserved for uplink communication only).

As further shown in FIG. 4, example 410 shows an example of sub-band full-duplex (SBFD) communication, which may also be referred to as "sub-band frequency division duplex (SBFDD)," "flexible duplex," or "frequency division duplexing (FDD) in unpaired spectrum." In SBFD, a UE may transmit an uplink communication to a network node and receive a downlink communication from the network node at the same time, but on different frequency resources. For example, the different frequency resources may be sub-bands of a frequency band, such as a time division duplexing (TDD) band. In this case, the frequency resources used for downlink communication may be separated from the frequency resources used for uplink communication, in the frequency domain, by a guard band.

As indicated above, FIG. 4 is provided as an example. Other examples may differ from what is described with regard to FIG. 4.

Figure 5:
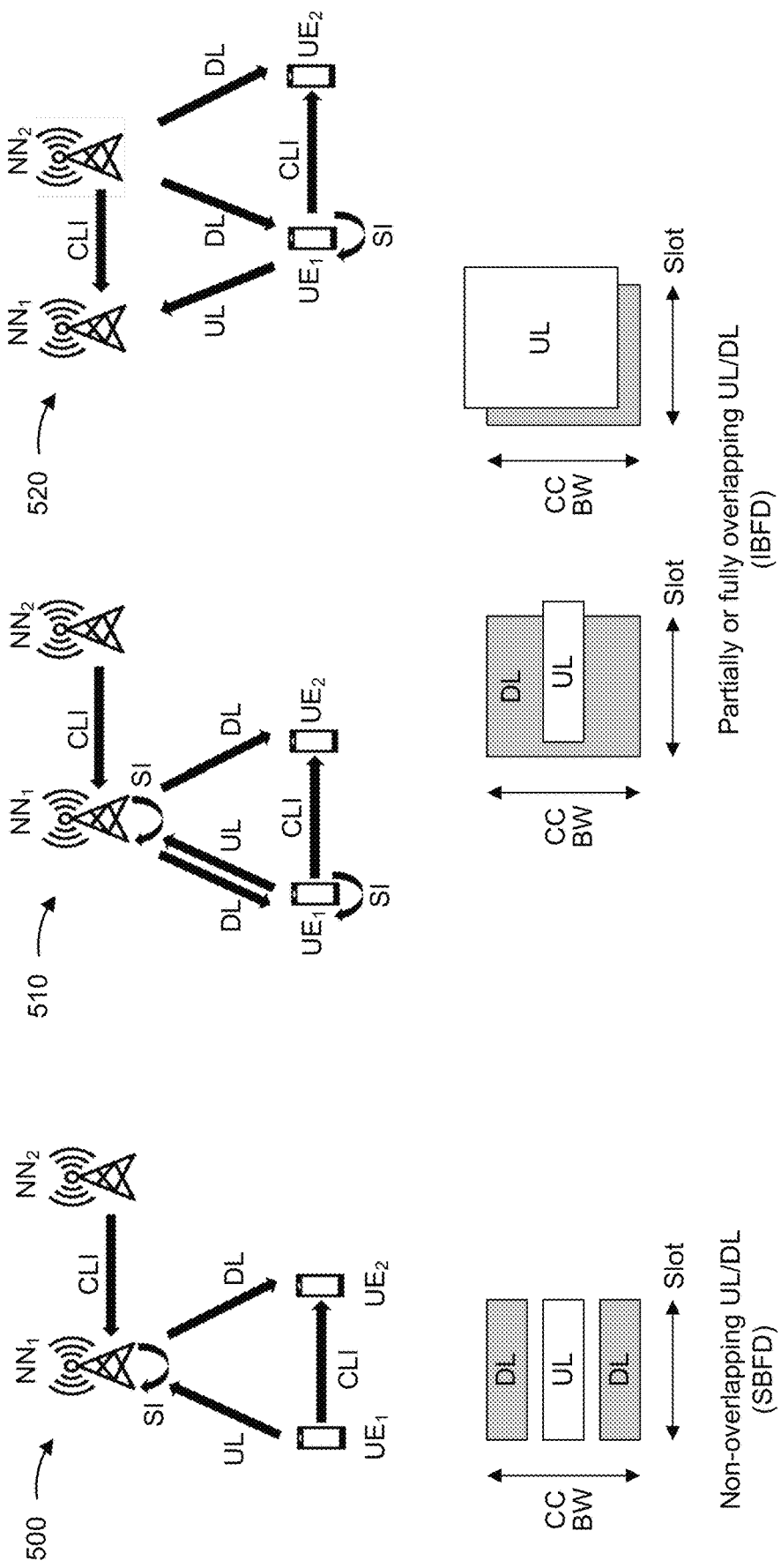
FIG. 5 is a diagram illustrating examples of full-duplex deployment scenarios, in accordance with the present disclosure.

FIG. 5 is a diagram illustrating examples 500, 510, 520 of full-duplex deployment scenarios, in accordance with the present disclosure. As shown in FIG. 5, examples 500, 510, 520 include one or more UEs in communication with one or more network nodes in a wireless network that supports full-duplex communication. In general, as described herein, utilizing a full-duplexing communication mode may provide reduced latency by allowing a downlink transmission to occur in an uplink-only slot and/or by allowing an uplink transmission to occur in a downlink-only slot. In addition, full-duplex communication may enhance spectral efficiency or throughput per cell or per UE and/or enable more efficient resource utilization by simultaneously utilizing time and frequency resources for downlink and uplink communication. However, as described in further detail herein, full-duplexing communication modes may be associated with dynamic interference conditions.

For example, as shown in FIG. 5, example 500 includes a first UE (shown as $UE_1$) and a second UE (shown as $UE_2$) in communication with a first network node (shown as $NN_1$) operating in a full-duplexing mode, with the first UE and the second UE operating in a half-duplexing mode. For example, as shown in FIG. 5, the first UE may transmit one or more uplink transmissions to the first network node, and the second UE may concurrently receive one or more downlink transmissions from the first network node. Accordingly, in example 500, the first network node is operating in a full-duplexing mode, and the first UE and the second UE are each operating in a half-duplexing mode. As shown by example 500, there may be various forms of interference that may degrade downlink reception performance at one or more UEs and/or uplink reception performance at the first network node operating in the full-duplexing mode. For example, as shown, the first network node may experience cross-link interference (CLI) caused by downlink transmissions from a second network node (shown as $NN_2$) that may be located in an adjacent or nearby cell. Furthermore, as shown, the uplink transmission from the first UE to the first network node may cause CLI at the second UE (e.g., CLI that interferes with downlink reception at the second UE). Furthermore, as shown, the first network node may experience self-interference, where the downlink transmission to the second UE interferes with reception of the uplink transmission from the first UE. For example, as described herein, self-interference may generally occur when a transmitted signal leaks into a receive port and/or when an object in a surrounding environment reflects a transmitted signal back to a receive port (e.g., causing a clutter echo effect), thus interfering with reception of a desired signal at the receive port. In general, the full-duplexing mode used by the first network node in example 500 may be an SBFD mode, where a component carrier bandwidth is divided into non-overlapping uplink and downlink sub-bands.

As further shown in FIG. 5, in example 510, a first UE may communicate with a first network node in a full-duplexing mode. For example, in example 510, the first UE may receive one or more downlink transmissions from the first network node, and the first UE may concurrently transmit one or more uplink transmissions to the first network node. Accordingly, in example 510, the first network node and the first UE are both operating in a full-duplexing mode. Furthermore, as shown, the first network node may be communicating with a second UE operating in a half-duplex mode. As shown in FIG. 5, the first UE may experience self-interference, where the uplink transmission to the first network node interferes with reception of the downlink transmission from the first network node, and the first UE may cause cross-link interference at the second UE, where the uplink transmission to the first network node interferes with downlink reception at the second UE. Additionally, in example 510, the first network node may experience CLI caused by one or more downlink transmissions from a second network node interfering with reception of the uplink transmission from the first UE, and the first network node may experience self-interference, where downlink transmission(s) to the first UE and/or the second UE interferes with reception of the uplink transmission from the first UE. In example 510, the full-duplex communication may be performed in an SBFD mode, where a component carrier bandwidth is divided into non-overlapping uplink and downlink sub-bands, or in an IBFD mode, where uplink and downlink resources fully or partially overlap.

As further shown in FIG. 5, in example 520, a first UE may communicate with a first network node and a second network node in a full-duplexing mode (e.g., a multi-TRP mode). For example, in example 520, the first UE may transmit one or more uplink transmissions to the first network node, and the first UE may concurrently receive one or more downlink transmissions from the second network node. Accordingly, in example 520, the first UE is operating in a full-duplexing mode, and the first and second network nodes are both operating in a half-duplexing mode. As shown in FIG. 5, the first UE may experience self-interference, where the uplink transmission to the first network node interferes with reception of the downlink transmission from the second network node. Furthermore, the uplink transmission by the first UE may cause CLI at a second UE that is receiving a downlink transmission from the second network node. Furthermore, as shown, the downlink transmission by the second network node may cause CLI interfering with reception of the uplink transmission from the first UE at the first network node. In example 520, the full-duplex communication may be performed in an SBFD mode, where a component carrier bandwidth is divided into non-overlapping uplink and downlink sub-bands, or in an IBFD mode, where uplink and downlink resources fully or partially overlap.

As indicated above, FIG. 5 is provided as an example. Other examples may differ from what is described with regard to FIG. 5.

Figure 6:
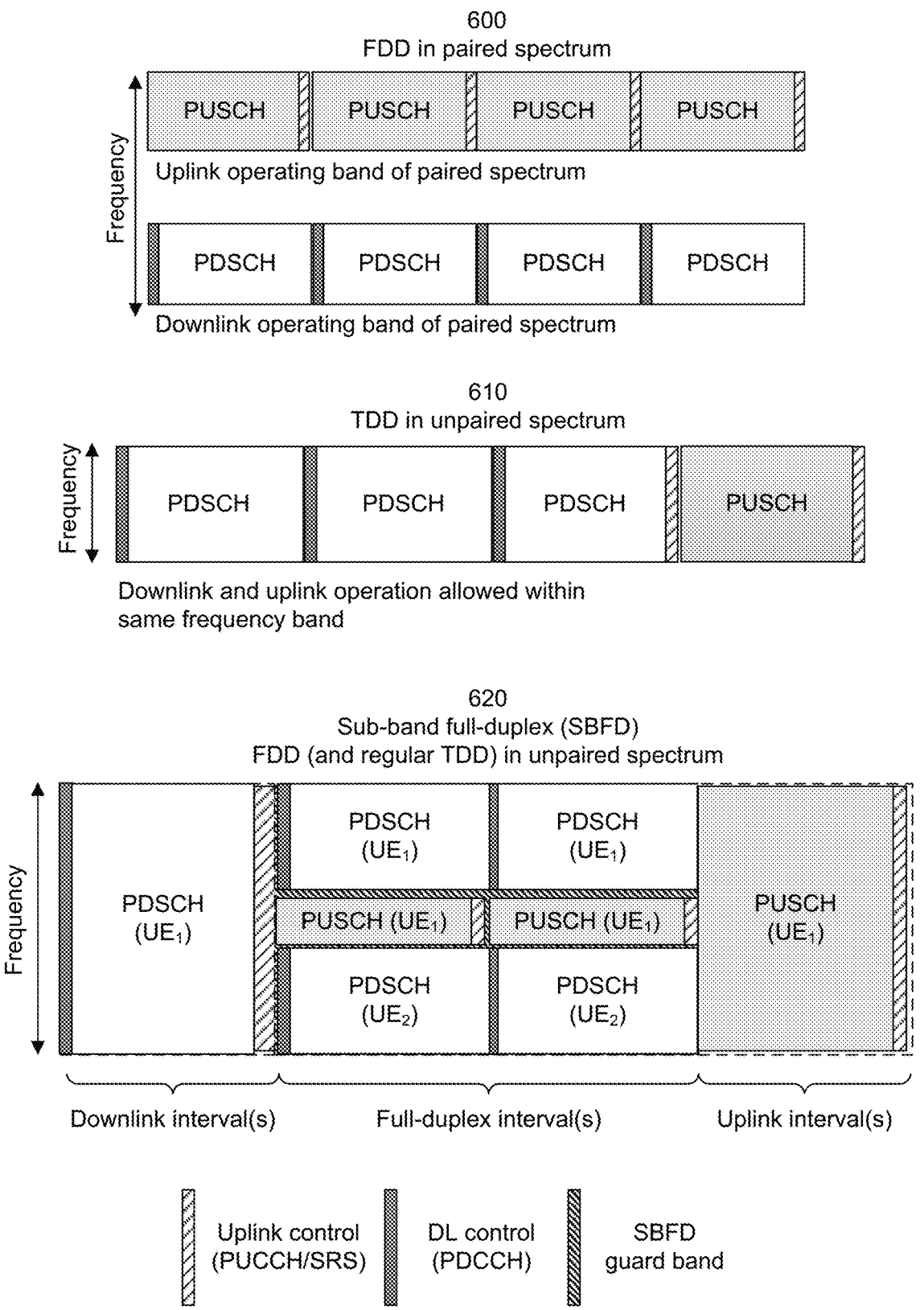
FIG. 6 is a diagram illustrating examples of different duplexing modes, in accordance with the present disclosure.

FIG. 6 is a diagram illustrating examples 600, 610, 620 of different duplexing modes, in accordance with the present disclosure. For example, as described in further detail herein, FIG. 6 illustrates an example 600 of an FDD mode that may be used in paired spectrum, an example 610 of a TDD mode that may be used in unpaired spectrum, and an example 620 of an SBFD mode that may be used in unpaired spectrum.

In some aspects, a wireless communication standard and/or governing body may generally specify one or more duplexing modes in which a wireless spectrum is to be used. For example, 3GPP may specify how wireless spectrum is to be used for the radio access technology and interface. As an example, a specification may indicate whether a band is to be used as paired spectrum in an FDD mode or as unpaired spectrum in a TDD mode.

For example, as shown by example 600, paired spectrum in the FDD mode may use a first frequency region (or channel) for uplink communication and a second frequency region (or channel) for downlink communication. In such cases, the frequency regions or channels used for uplink communication and downlink communication do not overlap, have different center frequencies, and have sufficient separation to prevent interference between the downlink communication and the uplink communication. For example, paired spectrum in FDD mode may include an uplink operating band and a downlink operating band that are configured to use non-overlapped frequency regions separated by a guard band. Accordingly, when operating in the FDD mode in paired spectrum, a UE with full-duplex capabilities may perform concurrent transmit and receive operations using the separate operating bands allocated to downlink and uplink communication. For example, paired bands in NR include NR operating bands n1, n2, n3, n5, n7, n8, n12, n20, n25, and n28, as specified by 3GPP Technical Specification (TS) 38.101-1.

Alternatively, as shown by example 610, unpaired spectrum in the TDD mode may allow downlink and uplink operation within a single frequency region (e.g., a single operating band). For example, when operating in TDD mode in unpaired spectrum, downlink communication and uplink communication may occur in the same frequency range. Some deployments may use TDD in the unpaired band, whereby some transmission time intervals (e.g., frames, slots, and/or symbols) are used for downlink communication only and other transmission time intervals are used for uplink communication only. In this case, substantially the entire bandwidth of a component carrier may be used for downlink communication or uplink communication, depending on whether the communication is performed in a downlink interval, an uplink interval, or a special interval (in which either downlink or uplink communication can be scheduled). Examples of unpaired bands include NR operating bands n40, n41, and n50, as specified by 3GPP TS 38.101-1. In some cases, however, using TDD in unpaired spectrum may be inefficient. For example, uplink transmit power may be limited, meaning that UEs may be incapable of transmitting with enough power to efficiently utilize the full bandwidth of an uplink slot. This may be particularly problematic in large cells at the cell edge. Furthermore, using TDD may introduce latency relative to a full-duplex scheme in which uplink communications and downlink communications can be performed in the same time interval, since TDD restricts usage of a given transmission time interval to uplink or downlink communication only. Furthermore, using TDD may reduce spectral efficiency and/or reduce throughput by restricting usage of a given transmission time interval to uplink or downlink communication only.

Accordingly, as shown by example 620, an unpaired band may be configured in a full-duplexing mode to enable concurrent transmit and receive operations in unpaired spectrum (e.g., a TDD band). For example, in FIG. 6, example 620 depicts an SBFD mode, which may be referred to herein as full-duplexing in a frequency division multiplexing (FDM) mode, in order to enable TDD operation and/or FDD operation in unpaired spectrum. For example, as shown in FIG. 6, an unpaired band configured in the SBFD mode may associate one or more transmission time intervals with downlink communication only (e.g., "D" slots), one or more transmission time intervals for uplink communication only (e.g., "U" slots), and one or more transmission time intervals for both downlink communication and uplink communication (e.g., "D+U" slots). Each transmission time interval may be associated with a control region, illustrated as a portion of a time interval with a diagonal fill for uplink control (e.g., a physical uplink control channel (PUCCH)) or a darker-shaded fill for downlink control (e.g., a physical downlink control channel (PDCCH)). Additionally, or alternatively, each time interval may be associated with a data region, which is shown as a physical downlink shared channel (PDSCH) for downlink frequency regions or a physical uplink shared channel (PUSCH) for uplink frequency regions.

In some aspects, an unpaired band configured in the SBFD mode may include one or more downlink-only time intervals, one or more uplink-only time intervals, and/or one or more full-duplex time intervals (e.g., frames, subframes, slots, and/or symbols, among other examples) that are associated with an FDD configuration. For example, as shown in FIG. 6, the FDD configuration associated with a full-duplex time interval may indicate one or more downlink frequency regions (or sub-bands) and one or more uplink frequency regions (or sub-bands) that are separated by a guard band. Accordingly, an FDD configuration may divide an unpaired frequency band (e.g., one or more component carriers of an unpaired band) into uplink frequency regions, downlink frequency regions, and/or other regions (e.g., guard bands and/or the like), which may enable a UE with full-duplex capabilities to perform simultaneous transmit and receive operations during one or more time intervals that are divided into downlink and uplink sub-bands with a guard band separation to prevent the uplink transmission from causing self-interference with respect to downlink reception. For example, in a given full-duplex time interval, a half-duplexing UE may either transmit using the uplink frequency region or receive in the downlink frequency region (e.g., in the illustrated example, $UE_2$ is communicating using half-duplexing and only receives in a lower downlink frequency region during the full-duplex time intervals), and a full-duplexing UE may transmit using the uplink frequency region and/or receive in the downlink frequency region (e.g., in the illustrated example, $UE_1$ is communicating using full-duplexing and therefore receives in an upper downlink frequency region simultaneous with transmission in an uplink frequency region during the full-duplex time intervals). In some aspects, the FDD configuration may identify bandwidth part (BWP) configurations corresponding to the uplink frequency regions and the downlink frequency regions. For example, a respective BWP may be configured for each uplink frequency region and each downlink frequency region.

Additionally, or alternatively, full-duplexing may be enabled in unpaired spectrum in an IBFD mode, which may be referred to herein as full-duplexing in a spatial division multiplexing (SDM) mode. For example, in an IBFD or SDM mode, uplink communication may occur on time and frequency resources that fully overlap time and frequency resources allocated to downlink communication (e.g., all of the time and frequency resources available for uplink communication are also available for downlink communication), or time and frequency resources that partially overlap with time and frequency resources available for downlink communication (e.g., some time and frequency resources available for uplink communication are also available for downlink communication and some time and frequency resources available for uplink communication are uplink-only). In general, in the IBFD mode, full-duplex communication may be conditional on sufficient beam separation between an uplink beam and a downlink beam (e.g., uplink transmission may be from one antenna panel and downlink reception may be in another antenna panel) in order to minimize self-interference that may occur when a transmitted signal leaks into a receive port and/or when an object in a surrounding environment reflects a transmitted signal back to a receive port (e.g., causing a clutter echo effect).

As indicated above, FIG. 6 is provided as an example. Other examples may differ from what is described with regard to FIG. 6.

Figure 7:
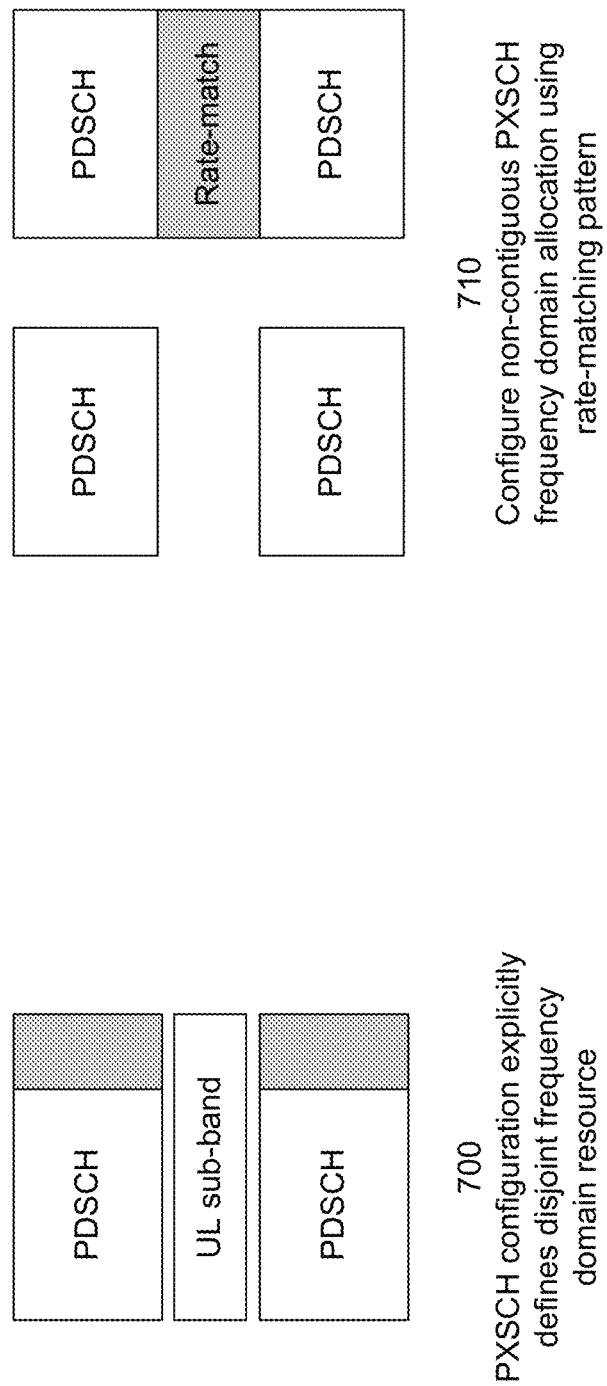
FIG. 7 is a diagram illustrating examples of non-contiguous frequency domain allocations for a channel state information (CSI) reference resource in full-duplex slots, in accordance with the present disclosure.

FIG. 7 is a diagram illustrating examples 700, 710 of non-contiguous frequency domain allocations for a CSI reference resource in full-duplex slots, in accordance with the present disclosure.

In a wireless network, CSI generally includes various parameters that relate to properties associated with a wireless channel and/or represent how a signal propagates from a transmitter to a receiver based on the combined effect of scattering, fading, and/or power decay with distance. Accordingly, a network node can use CSI obtained by a UE to adapt transmissions to current channel conditions, which may increase reliability and/or throughput in the wireless network.

CSI is typically obtained based on one or more reference signal transmissions that can be used for downlink and/or uplink channel estimation. For example, in some aspects, a CSI-RS may carry information used for downlink channel estimation (e.g., downlink CSI acquisition), which a network node may use for scheduling, link adaptation, or beam management, among other examples. The network node may configure a CSI-RS for a UE, and the UE may measure the configured CSI-RS. Based at least in part on the measurements, the UE may perform channel estimation and may report channel estimation parameters to the base station (e.g., in a CSI report), such as a CQI, a precoding matrix indicator (PMI), a CSI-RS resource indicator (CRI), a layer indicator (LI), a rank indicator (RI), or an RSRP, among other examples. The network node may use the CSI report to select transmission parameters for downlink communications to the UE, such as a number of transmission layers (e.g., a rank), a precoding matrix (e.g., a precoder), an MCS, or a refined downlink beam (e.g., using a beam refinement procedure or a beam management procedure), among other examples.

In some cases, one or more CSI parameters that are included in a CSI report (e.g., a CQI) are calculated based on a hypothetical PDSCH transmission scheduled in a "CSI reference resource" (e.g., as defined in 3GPP TS 38.214, Section 5.2.2.5). For example, in a frequency domain, a CSI reference resource for a serving cell is defined by a group of downlink physical resource blocks that correspond to a band to which derived CSI relates. In a time domain, the CSI reference resource defines a reference downlink slot number as a timing reference for determining the end of a measurement window for a CSI report (e.g., a CSI report should not include any channel and/or interference measurements obtained after the reference downlink slot number). Furthermore, the CSI reference resource typically defines various properties for the hypothetical PDSCH transmission used to calculate the CSI parameters (e.g., a reference signal overhead, bandwidth, and/or precoding, among other examples). For example, in cases where a UE is configured to report one or more CSI parameters (e.g., a CQI index, a PMI, an RI, or the like) based on a hypothetical PDSCH transmission in the CSI reference resource, the UE generally assumes that the first two (2) symbols of the CSI reference resource are occupied by control signaling, the number of PDSCH and DMRS symbols is twelve (12), a BWP subcarrier spacing is the same as configured for PDSCH reception, a bandwidth is as configured for a corresponding CSI parameter, the CSI reference resource uses the cyclic prefix length and subcarrier spacing configured for PDSCH reception, no resource elements are used by a primary synchronization signal, a secondary synchronization signal, or a physical broadcast channel, a redundancy version is zero (0), a ratio of a PDSCH energy per resource element (EPRE) to a CSI-RS EPRE has a defined value (e.g., given in 3GPP TS 38.214, Clause 5.2.2.3.1), and/or that no resource elements (REs) are allocated to a non-zero-power (NZP) CSI-RS and/or a zero-power (ZP) CSI-RS.

However, in cases where a UE is configured to communicate in a full-duplexing mode, one or more assumptions regarding the CSI reference resource may not hold. For example, as described above, the UE typically assumes that the bandwidth of the CSI reference resource is the same as configured for a corresponding CSI parameter (e.g., for a corresponding CQI report), and further assumes that no REs are allocated for a ZP CSI-RS used for rate-matching. Accordingly, because an SBFD mode is associated with non-contiguous downlink frequency resources, there may be a need to adapt a CSI-RS resource configuration for full-duplex communication (e.g., because a portion of the bandwidth is not available for downlink). For example, in an SBFD mode associated with non-contiguous downlink frequency resources, a CSI report may be linked to two disjoint CSI-RS resources (e.g., a first CSI-RS resource in a first sub-band and a second CSI-RS resource in a second sub-band), or a CSI report may be linked to one non-contiguous CSI-RS resource that may be defined with a start and ending resource block or based on a bitmap. Accordingly, because a CSI reference resource is generally used to carry a hypothetical PDSCH transmission, some aspects described herein relate to a CSI reference resource definition that may be based on one or more non-contiguous resource allocations that may be used for a PDSCH and/or a PUSCH in an SBFD slot, where a middle frequency region is used for uplink-only.

For example, referring to FIG. 7, example 700 illustrates a PXSCH (e.g., a PDSCH and/or a PUSCH) configuration that explicitly defines a disjoint frequency domain resource. In such cases, there may be a frequency domain resource allocation (FDRA) specific to SBFD slots, which may use a bitmap or two start and length indicators to explicitly define the disjoint frequency domain resource. For example, as shown, the FDRA may map the PDSCH to the RBs that are available for downlink in SBFD slots. Alternatively, example 710 illustrates a non-contiguous PXSCH frequency domain allocation based on a continuous PDSCH allocation that spans the entire BWP, and a rate-matching pattern is defined to achieve the non-contiguous PXSCH frequency domain allocation. In this case, one or more ZP CSI-RS resources are defined to rate match around the uplink sub-band (e.g., the one or more ZP CSI-RS resources include time and frequency resources in which no signal is transmitted). In this way, combining the contiguous PDSCH resource allocation with the rate-matching pattern removes the uplink frequency region from the contiguous PDSCH resource allocation, resulting in the non-contiguous PXSCH frequency domain allocation to be used in SBFD slots. Furthermore, some aspects described herein (e.g., with reference to FIG. 8 and FIG. 9) relate to techniques to indicate a duplex mode of a CSI report (e.g., using a non-contiguous PXSCH frequency domain allocation), to relate a CSI report to a CSI-RS configuration, and/or to configure a CSI reference resource for different duplex modes.

As indicated above, FIG. 7 is provided as an example. Other examples may differ from what is described with regard to FIG. 7.

Figure 8:
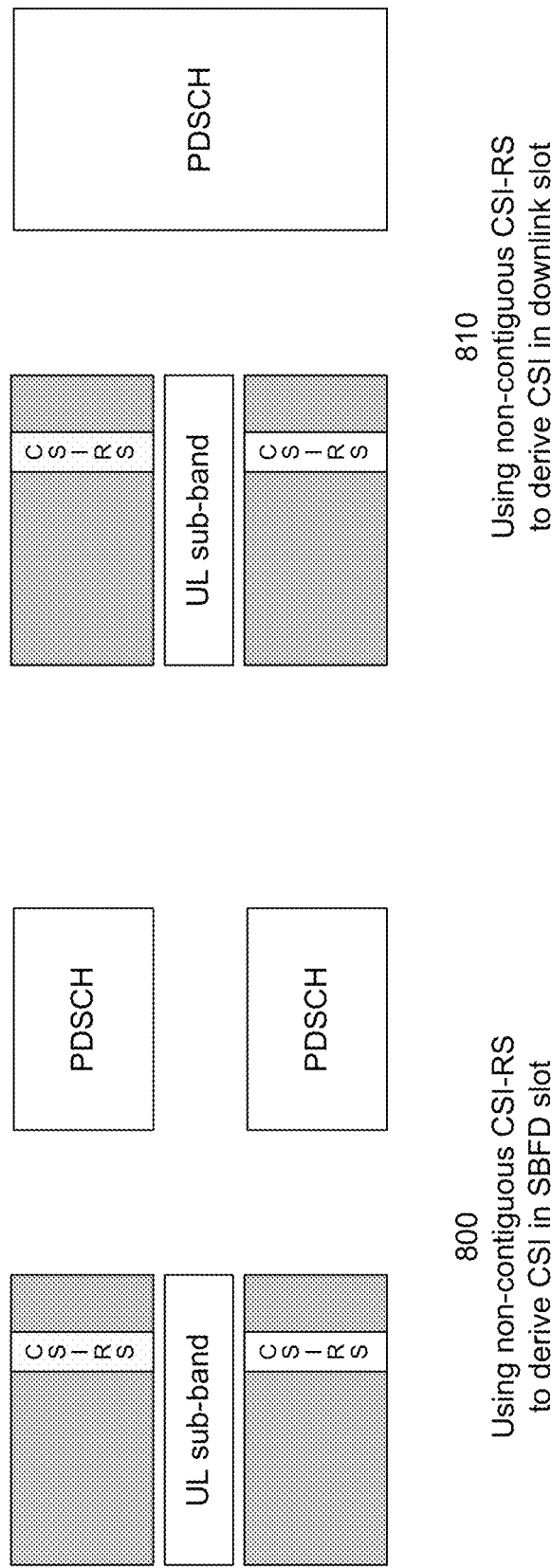
FIG. 8 is a diagram illustrating examples of non-contiguous CSI reference signal (CSI-RS) configurations that may be used to derive CSI in full-duplex slots, in accordance with the present disclosure.

FIG. 8 is a diagram illustrating examples 800, 810 of non-contiguous CSI-RS configurations that may be used to derive CSI in full-duplex slots, in accordance with the present disclosure. In particular, example 800 depicts a first case, where a CSI-RS resource configuration matches the frequency domain resources of a PDSCH transmission in a full-duplex (e.g., SBFD) slot. For example, the PDSCH transmission in a full-duplex slot includes non-contiguous frequency domain resources that are separated by an uplink sub-band, and the CSI-RS resource configuration matches the non-contiguous frequency domain resources of the PDSCH transmission. In this case, as shown by example 800, a sub-band CSI-RS (e.g., covering only the non-contiguous frequency domain resources of the PDSCH transmission) is used to derive CSI for a PDSCH transmission in SBFD slots. Furthermore, although not explicitly shown in FIG. 8, a wideband CSI-RS (e.g., covering the entire BWP) would be used to derive CSI for a PDSCH transmission in downlink slots. Additionally, or alternatively, example 810 depicts a second case, where a network node may configure a non-contiguous CSI-RS to be used to derive wideband CSI in SBFD slots (e.g., using interpolation) and/or a wideband contiguous CSI-RS in downlink slots to derive CSI for both SBFD slots and downlink slots. In this case, as shown, the frequency domain resources of the CSI-RS do not have to match the frequency domain resources of the PDSCH, and interpolation can be used to obtain the wideband CSI based on the non-contiguous CSI-RS.

In general, as described herein, the different cases for CSI-RS configuration and CSI derivation (e.g., using a non-contiguous CSI-RS resource configuration that matches the frequency domain resources of the PDSCH transmission to derive CSI in SBFD slots and/or a non-contiguous CSI-RS resource configuration and interpolation to derive CSI in downlink slots) necessitate different definitions for the CSI reference resource (e.g., a set of resources to carry a hypothetical PDSCH transmission for deriving one or more CSI parameters), which may then be used to determine a number of REs to be used to derive the one or more CSI parameters (e.g., CQI).

As indicated above, FIG. 8 is provided as an example. Other examples may differ from what is described with regard to FIG. 8.

Figure 9:
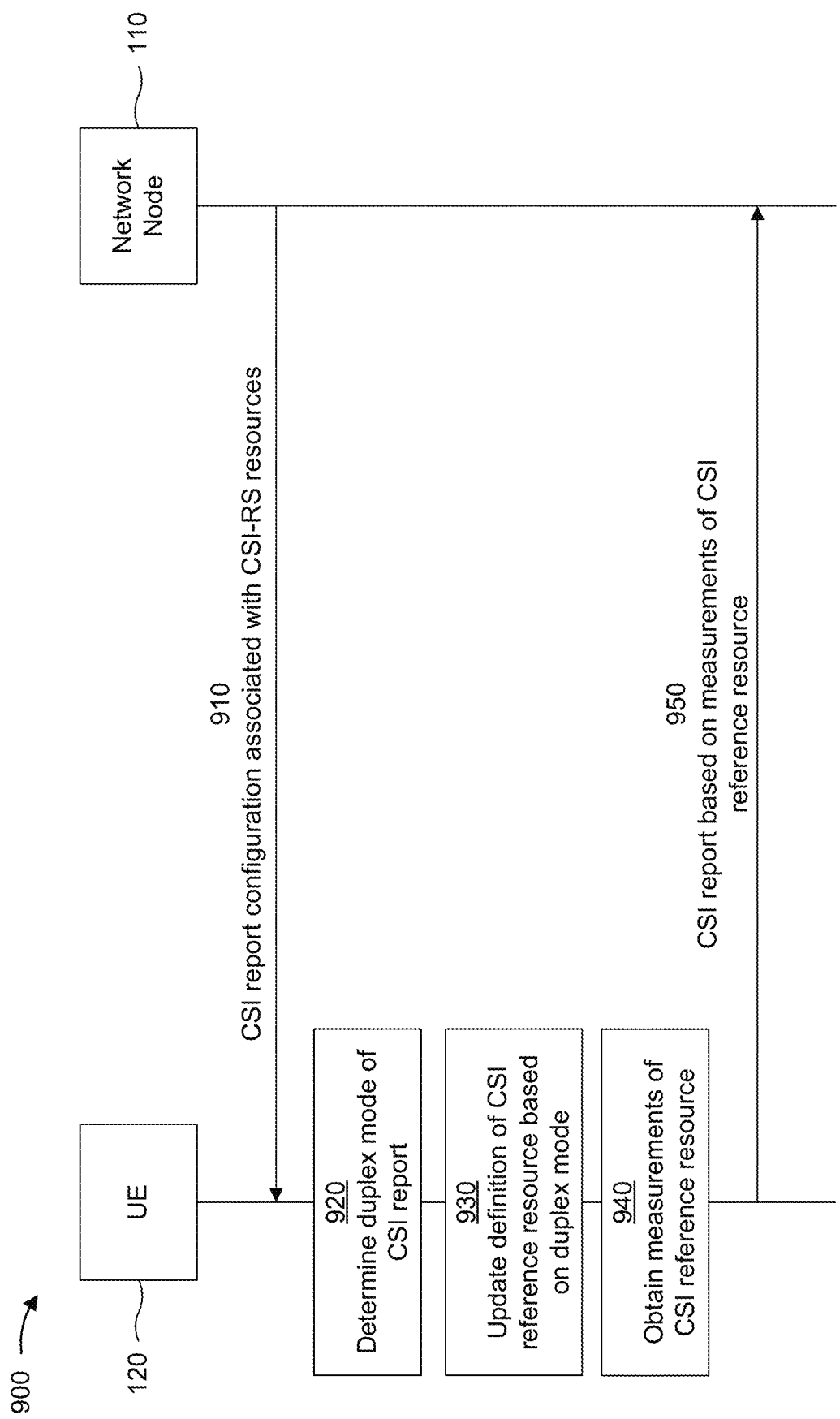
FIG. 9 is a diagram illustrating an example associated with a CSI reference resource definition in full-duplex communication modes, in accordance with the present disclosure.

FIG. 9 is a diagram illustrating an example 900 associated with a CSI reference resource definition in full-duplex communication modes, in accordance with the present disclosure. As shown in FIG. 9, example 900 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown in FIG. 9, and by reference number 910, the network node 110 may transmit, to the UE 120, a CSI report configuration associated with a set of CSI-RS resources. For example, in some aspects, the CSI-RS resources may include a wideband CSI-RS that the UE 120 is to use to derive CSI for a PDSCH in downlink slots, a sub-band CSI-RS that the UE 120 is to use to derive CSI for a PDSCH in SBFD slots, a non-contiguous CSI-RS that the UE 120 is to use to derive CSI in SBFD slots and downlink slots (e.g., using interpolation), and/or a wideband contiguous CSI-RS that the UE 120 is to use to derive CSI in both downlink and SBFD slots. Accordingly, because the hypothetical PDSCH transmission associated with a CSI reference resource may be transmitted in a downlink (or half-duplex) slot or an SBFD (or full-duplex) slot, which are associated with different frequency domain resource allocations, the UE 120 may need to differentiate between full-duplex and half-duplex CSI reports.

As shown by reference number 920, the UE 120 may determine the duplex mode of the CSI report. For example, in some aspects, the UE 120 may determine the duplex mode of the CSI report based on the frequency domain resources of the CSI-RS resources associated with the CSI report. For example, the duplex mode of the CSI report may be SBFD in cases where the CSI report is associated with non-contiguous CSI-RS resources, or the duplex mode of the CSI report may be half-duplex in cases where the CSI report is associated with contiguous CSI-RS resources. Alternatively, in some aspects, the duplex mode of the CSI report may be independent from the frequency domain allocation of the CSI-RS resources associated with the CSI report. For example, rather than being tied to the frequency domain allocation of the CSI-RS resources associated with the CSI report, the duplex mode of the CSI report may be explicitly indicated in the CSI report configuration provided by the network node 110 and/or in a downlink control information (DCI) message triggering transmission of a CSI report associated with the CSI report configuration. For example, in such cases, the CSI report configuration and/or the triggering DCI may include a binary indication of a half-duplex mode or a full-duplex mode for the CSI report. Alternatively, the CSI report configuration and/or the triggering DCI may include an explicit definition of a non-contiguous bandwidth that the UE 120 is to use for CSI derivation. In the latter case, indicating the duplex mode in the CSI report configuration and/or the triggering DCI may provide the network node 110 with greater flexibility to link the same CSI-RS resource set to half-duplex CSI reports and full-duplex CSI reports.

As shown by reference number 930, the UE 120 may update the definition of a CSI reference resource based on the duplex mode of the CSI report. For example, as described herein, one or more CSI parameters that are included in a CSI report (e.g., a CQI) may be calculated based on a hypothetical PDSCH transmission scheduled in a CSI reference resource, which is defined by a group of downlink physical resource blocks that correspond to a band to which derived CSI relates in a frequency domain. Among other assumptions, a UE 120 typically assumes that the bandwidth of the CSI reference resource is the same as configured for the corresponding CSI report. Accordingly, the definition of the CSI reference resource may need to be updated to account for cases where a PXSCH configuration explicitly defines disjoint frequency domain resources, such as disjoint downlink and uplink frequency regions used in SBFD slots. In particular, the UE 120 may update the definition of the CSI reference resource to reflect the PXSCH frequency domain resources associated with half-duplex and/or SBFD slots. For example, in some aspects, the bandwidth of the CSI reference resource may be contiguous for a half-duplex CSI report or non-contiguous for an SBFD CSI report. Accordingly, the UE 120 may determine the number of available REs associated with the CSI reference resource based on the bandwidth of the CSI reference resource (which depends on the duplex mode of the CSI report), which can affect the CQI or other CSI parameter(s) calculated based on the hypothetical PDSCH transmission in the CSI reference resource. For example, in some aspects, one or more downlink sub-bands to be considered part of the CSI reference resource may be defined in a wireless communication standard, or the downlink sub-bands may be adjusted based on the bandwidth of the CSI report configuration.

Additionally, or alternatively, in cases where a non-contiguous PXSCH frequency domain allocation is achieved in SBFD slots using a rate-matching pattern (e.g., as described above with reference to FIG. 7), the UE 120 may update the definition of the CSI reference resource to include ZP-CSI-RS resources for full-duplex CSI reports. For example, as described herein, another assumption that a UE 120 typically applies for a CSI reference resource is that there are no REs allocated to ZP-CSI-RS resources. However, this assumption may be incorrect in cases where a non-contiguous PXSCH frequency domain allocation is achieved in SBFD slots using a rate-matching pattern, where ZP-CSI-RS resources are defined to rate match around the uplink sub-band. Accordingly, in a case where the CSI report is determined to be a full-duplex CSI report, the UE 120 may update the definition of the CSI reference resource to include ZP-CSI-RS resources in order to capture the non-contiguous frequency domain resources (note that the definition of the CSI reference resource does not need to be updated in the case of a half-duplex CSI report, because there would not be any ZP-CSI-RS resources defined in downlink slots where the full PDSCH allocation is used). In some aspects, when the definition of the CSI reference resource is updated to include ZP-CSI-RS resources for full-duplex CSI reports, the number of REs allocated to the ZP-CSI-RS may be defined as a fixed number, defined based on a fixed split between uplink and downlink resource allocations, or adjustable based on the CSI report configuration.

As further shown by reference number 940, the UE 120 may then obtain measurements of the CSI reference resource based on the duplex mode of the CSI report, including any updates to the definition of the CSI reference resource that are based on the duplex mode of the CSI report. As shown by reference number 950, the UE 120 may transmit a CSI report to the network node 110 based on the measurements of the CSI reference resource. For example, the UE 120 may calculate a CQI, PMI, RI, and/or other suitable CSI parameters based on the hypothetical PDSCH transmission scheduled in the CSI reference resource, where the calculation of the CSI parameter(s) may depend on whether the CSI report is a half-duplex or full-duplex report. In this way, the network node may use the CSI report to select transmission parameters for downlink communications to the UE 120 in half-duplex and/or full-duplex slots. For example, the network node may use the CSI report to select transmission parameters such as a number of transmission layers (e.g., a rank), a precoding matrix (e.g., a precoder), and/or an MCS, among other examples.

As indicated above, FIG. 9 is provided as an example. Other examples may differ from what is described with regard to FIG. 9.

Figure 10:
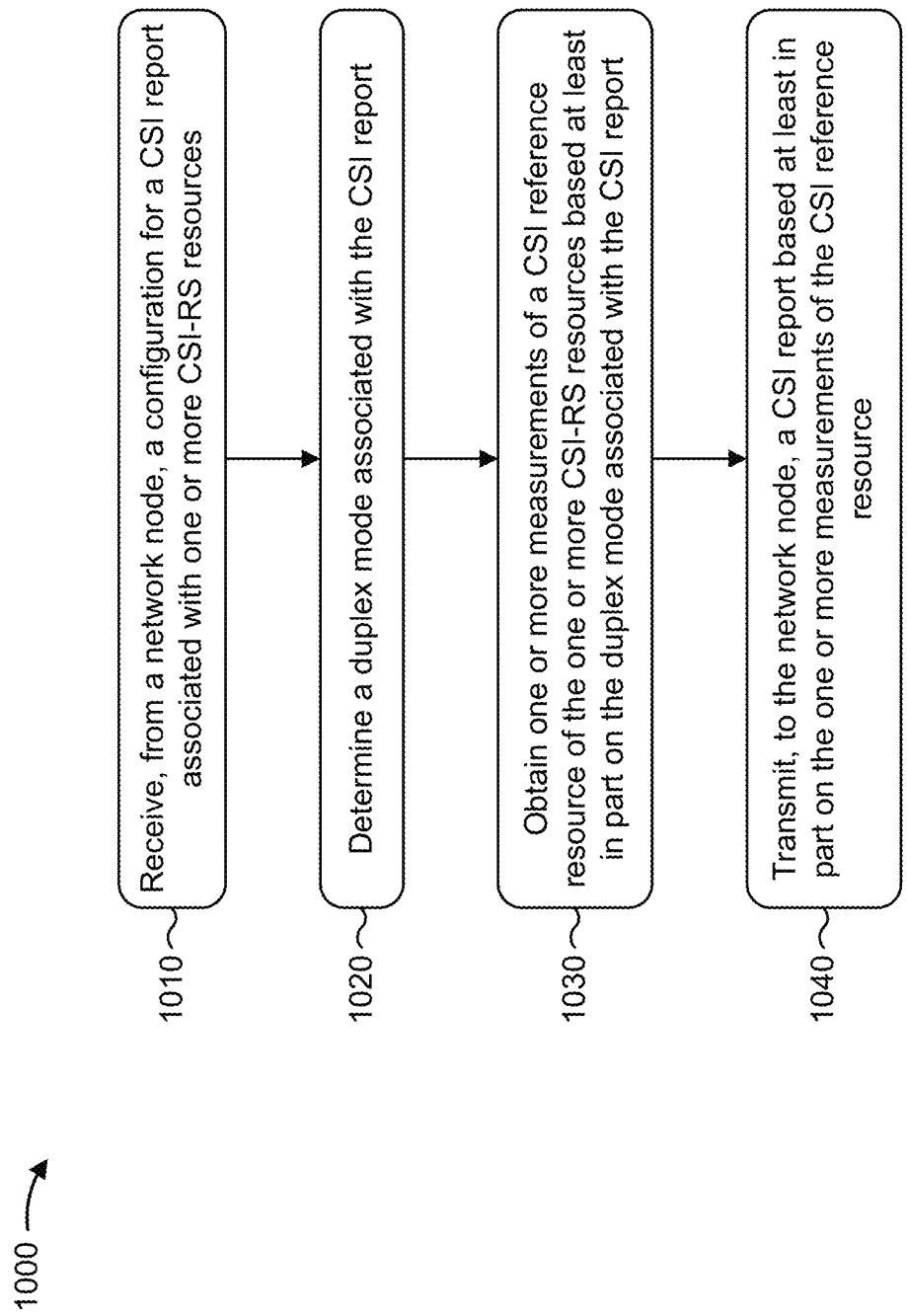
FIGS. 10-11 are diagrams illustrating example processes associated with CSI reference resource definition in full-duplex communication modes, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with a CSI reference resource definition in full-duplex communication modes.

As shown in FIG. 10, in some aspects, process 1000 may include receiving, from a network node, a configuration for a CSI report associated with one or more CSI-RS resources (block 1010). For example, the UE (e.g., using communication manager 140 and/or reception component 1202, depicted in FIG. 12) may receive, from a network node, a configuration for a CSI report associated with one or more CSI-RS resources, as described above.

As further shown in FIG. 10, in some aspects, process 1000 may include determining a duplex mode associated with the CSI report (block 1020). For example, the UE (e.g., using communication manager 140 and/or CSI report component 1208, depicted in FIG. 12) may determine a duplex mode associated with the CSI report, as described above.

As further shown in FIG. 10, in some aspects, process 1000 may include obtaining one or more measurements of a CSI reference resource of the one or more CSI-RS resources based at least in part on the duplex mode associated with the CSI report (block 1030). For example, the UE (e.g., using communication manager 140 and/or CSI report component 1208, depicted in FIG. 12) may obtain one or more measurements of a CSI reference resource of the one or more CSI-RS resources based at least in part on the duplex mode associated with the CSI report, as described above.

As further shown in FIG. 10, in some aspects, process 1000 may include transmitting, to the network node, the CSI report based at least in part on the one or more measurements of the CSI reference resource (block 1040). For example, the UE (e.g., using communication manager 140 and/or transmission component 1204, depicted in FIG. 12) may transmit, to the network node, the CSI report based at least in part on the one or more measurements of the CSI reference resource, as described above.

Process 1000 may include additional aspects, such as any single aspect or any combination of aspects described below and/or in connection with one or more other processes described elsewhere herein.

In a first aspect, the duplex mode associated with the CSI report is determined based at least in part on a frequency domain resource allocation of the one or more CSI-RS resources associated with the CSI report.

In a second aspect, alone or in combination with the first aspect, the duplex mode is determined as full-duplex based at least in part on the one or more CSI-RS resources having a non-contiguous frequency domain resource allocation.

In a third aspect, alone or in combination with one or more of the first and second aspects, the duplex mode is determined as half-duplex based at least in part on the one or more CSI-RS resources having a contiguous frequency domain resource allocation.

In a fourth aspect, alone or in combination with one or more of the first through third aspects, the duplex mode associated with the CSI report is indicated in the configuration for the CSI report or in a DCI received by the UE, the DCI triggering transmission of the CSI report.

In a fifth aspect, alone or in combination with one or more of the first through fourth aspects, the configuration for the CSI report or the DCI triggering transmission of the CSI report includes a binary indication of a half-duplex mode or a full-duplex mode for the CSI report.

In a sixth aspect, alone or in combination with one or more of the first through fifth aspects, the configuration for the CSI report or the DCI triggering transmission of the CSI report indicates the duplex mode for the CSI report according to a contiguous or non-contiguous bandwidth for CSI derivation.

In a seventh aspect, alone or in combination with one or more of the first through sixth aspects, process 1000 includes determining a bandwidth of the CSI reference resource based at least in part on the duplex mode associated with the CSI report.

In an eighth aspect, alone or in combination with one or more of the first through seventh aspects, the bandwidth of the CSI reference resource is determined as contiguous based at least in part on the duplex mode associated with the CSI report being half-duplex.

In a ninth aspect, alone or in combination with one or more of the first through eighth aspects, the bandwidth of the CSI reference resource is determined as non-contiguous based at least in part on the duplex mode associated with the CSI report being full-duplex.

In a tenth aspect, alone or in combination with one or more of the first through ninth aspects, the CSI reference resource includes one or more REs allocated to ZP-CSI-RS resources based at least in part on the duplex mode associated with the CSI report being full-duplex.

In an eleventh aspect, alone or in combination with one or more of the first through tenth aspects, a number of the one or more REs allocated to the ZP-CSI-RS resources has a fixed value.

In a twelfth aspect, alone or in combination with one or more of the first through eleventh aspects, a number of the one or more REs allocated to the ZP-CSI-RS resources is based at least in part on a fixed split between uplink and downlink resources.

In a thirteenth aspect, alone or in combination with one or more of the first through twelfth aspects, a number of the one or more REs allocated to the ZP-CSI-RS resources is based at least in part on the configuration for the CSI report.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
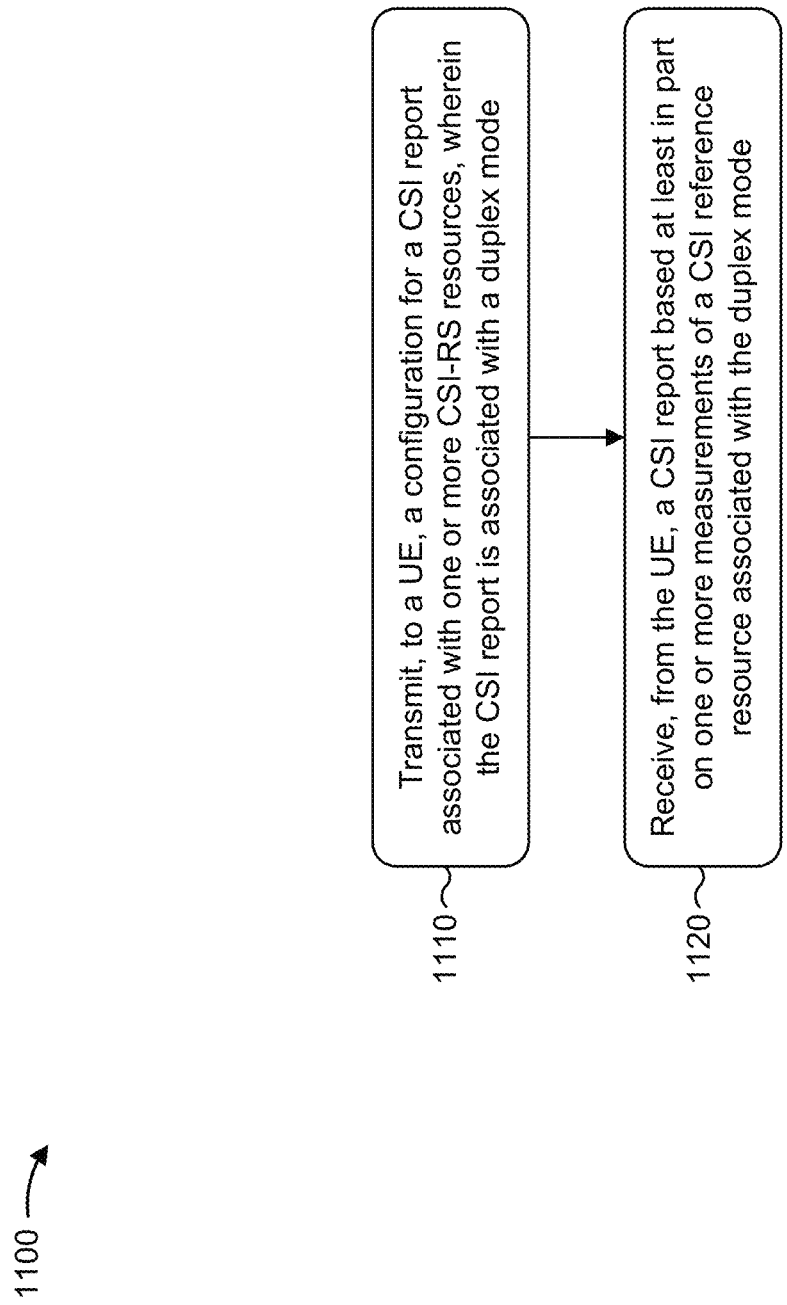

FIG. 11 is a diagram illustrating an example process 1100 performed, for example, by a network node, in accordance with the present disclosure. Example process 1100 is an example where the network node (e.g., network node 110) performs operations associated with a CSI reference resource definition in full-duplex communication modes.

As shown in FIG. 11, in some aspects, process 1100 may include transmitting, to a UE, a configuration for a CSI report associated with one or more CSI-RS resources, wherein the CSI report is associated with a duplex mode (block 1110). For example, the network node (e.g., using communication manager 150 and/or transmission component 1304, depicted in FIG. 13) may transmit, to a UE, a configuration for a CSI report associated with one or more CSI-RS resources, wherein the CSI report is associated with a duplex mode, as described above.

As further shown in FIG. 11, in some aspects, process 1100 may include receiving, from the UE, a CSI report based at least in part on one or more measurements of a CSI reference resource associated with the duplex mode (block 1120). For example, the network node (e.g., using communication manager 150 and/or reception component 1302, depicted in FIG. 13) may receive, from the UE, a CSI report based at least in part on one or more measurements of a CSI reference resource associated with the duplex mode, as described above.

Process 1100 may include additional aspects, such as any single aspect or any combination of aspects described below and/or in connection with one or more other processes described elsewhere herein.

In a first aspect, the duplex mode associated with the CSI report is determined based at least in part on a frequency domain resource allocation of the one or more CSI-RS resources associated with the CSI report.

In a second aspect, alone or in combination with the first aspect, the duplex mode is determined as full-duplex based at least in part on the one or more CSI-RS resources having a non-contiguous frequency domain resource allocation.

In a third aspect, alone or in combination with one or more of the first and second aspects, the duplex mode is determined as half-duplex based at least in part on the one or more CSI-RS resources having a contiguous frequency domain resource allocation.

In a fourth aspect, alone or in combination with one or more of the first through third aspects, the duplex mode associated with the CSI report is indicated in the configuration for the CSI report or in a DCI transmitted to the UE, the DCI triggering transmission of the CSI report.

In a fifth aspect, alone or in combination with one or more of the first through fourth aspects, the configuration for the CSI report or the DCI triggering transmission of the CSI report includes a binary indication of a half-duplex mode or a full-duplex mode for the CSI report.

In a sixth aspect, alone or in combination with one or more of the first through fifth aspects, the configuration for the CSI report or the DCI triggering transmission of the CSI report indicates the duplex mode for the CSI report according to a contiguous or non-contiguous bandwidth for CSI derivation.

In a seventh aspect, alone or in combination with one or more of the first through sixth aspects, process 1100 includes determining a bandwidth of the CSI reference resource based at least in part on the duplex mode associated with the CSI report.

In an eighth aspect, alone or in combination with one or more of the first through seventh aspects, the bandwidth of the CSI reference resource is determined as contiguous based at least in part on the duplex mode associated with the CSI report being half-duplex.

In a ninth aspect, alone or in combination with one or more of the first through eighth aspects, the bandwidth of the CSI reference resource is determined as non-contiguous based at least in part on the duplex mode associated with the CSI report being full-duplex.

In a tenth aspect, alone or in combination with one or more of the first through ninth aspects, the CSI reference resource includes one or more REs allocated to ZP-CSI-RS resources based at least in part on the duplex mode associated with the CSI report being full-duplex.

In an eleventh aspect, alone or in combination with one or more of the first through tenth aspects, a number of the one or more REs allocated to the ZP-CSI-RS resources has a fixed value.

In a twelfth aspect, alone or in combination with one or more of the first through eleventh aspects, a number of the one or more REs allocated to the ZP-CSI-RS resources is based at least in part on a fixed split between uplink and downlink resources.

In a thirteenth aspect, alone or in combination with one or more of the first through twelfth aspects, a number of the one or more REs allocated to the ZP-CSI-RS resources is based at least in part on the configuration for the CSI report.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
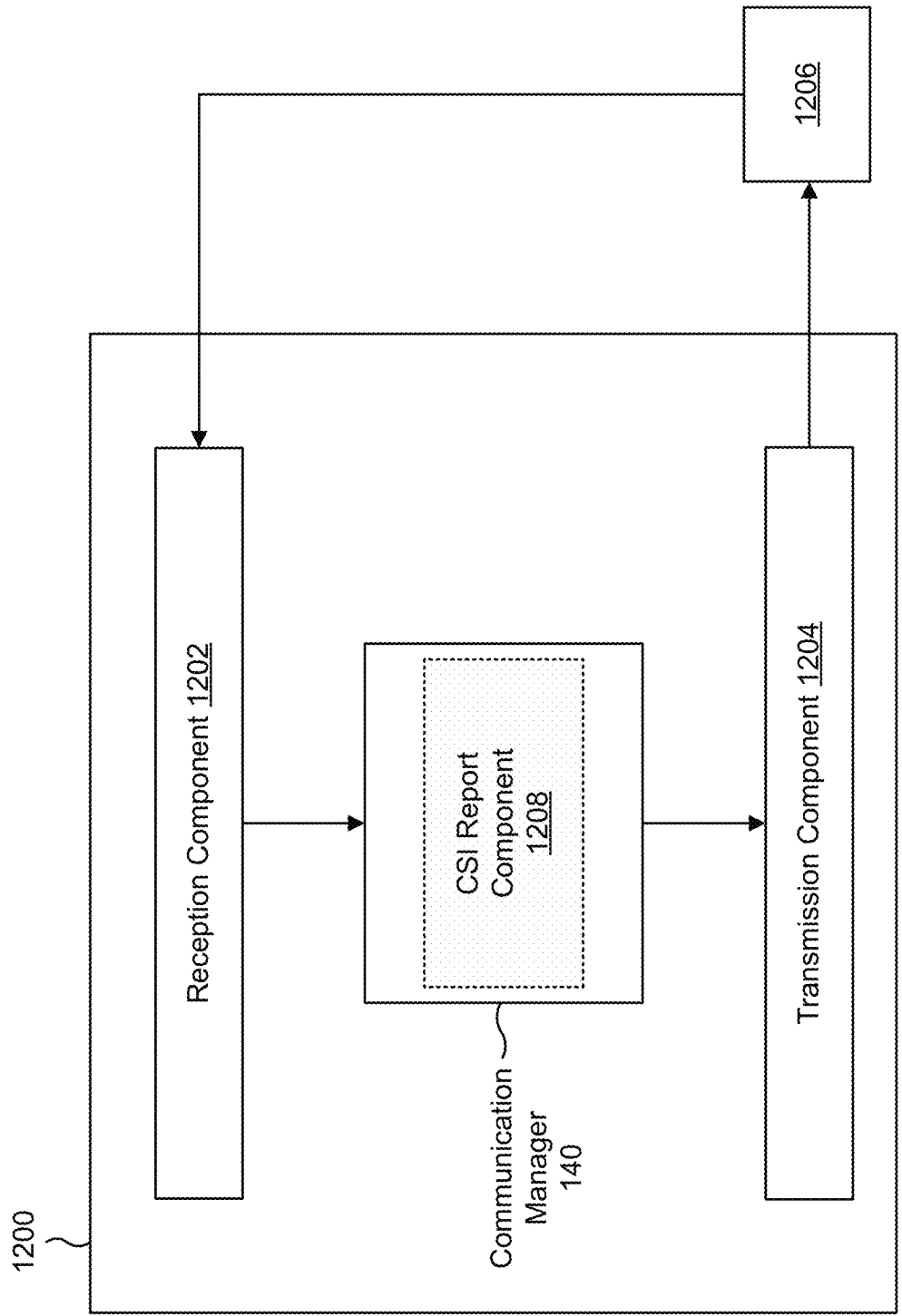
FIGS. 12-13 are diagrams of example apparatuses for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a CSI report component 1208, among other examples.

In some aspects, the apparatus 1200 may be configured to perform one or more operations described herein in connection with FIGS. 7-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive, from a network node, a configuration for a CSI report associated with one or more CSI-RS resources. The CSI report component 1208 may determine a duplex mode associated with the CSI report. The CSI report component 1208 may obtain one or more measurements of a CSI reference resource of the one or more CSI-RS resources based at least in part on the duplex mode associated with the CSI report. The transmission component 1204 may transmit, to the network node, the CSI report based at least in part on the one or more measurements of the CSI reference resource.

The CSI report component 1208 may determine a bandwidth of the CSI reference resource based at least in part on the duplex mode associated with the CSI report.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
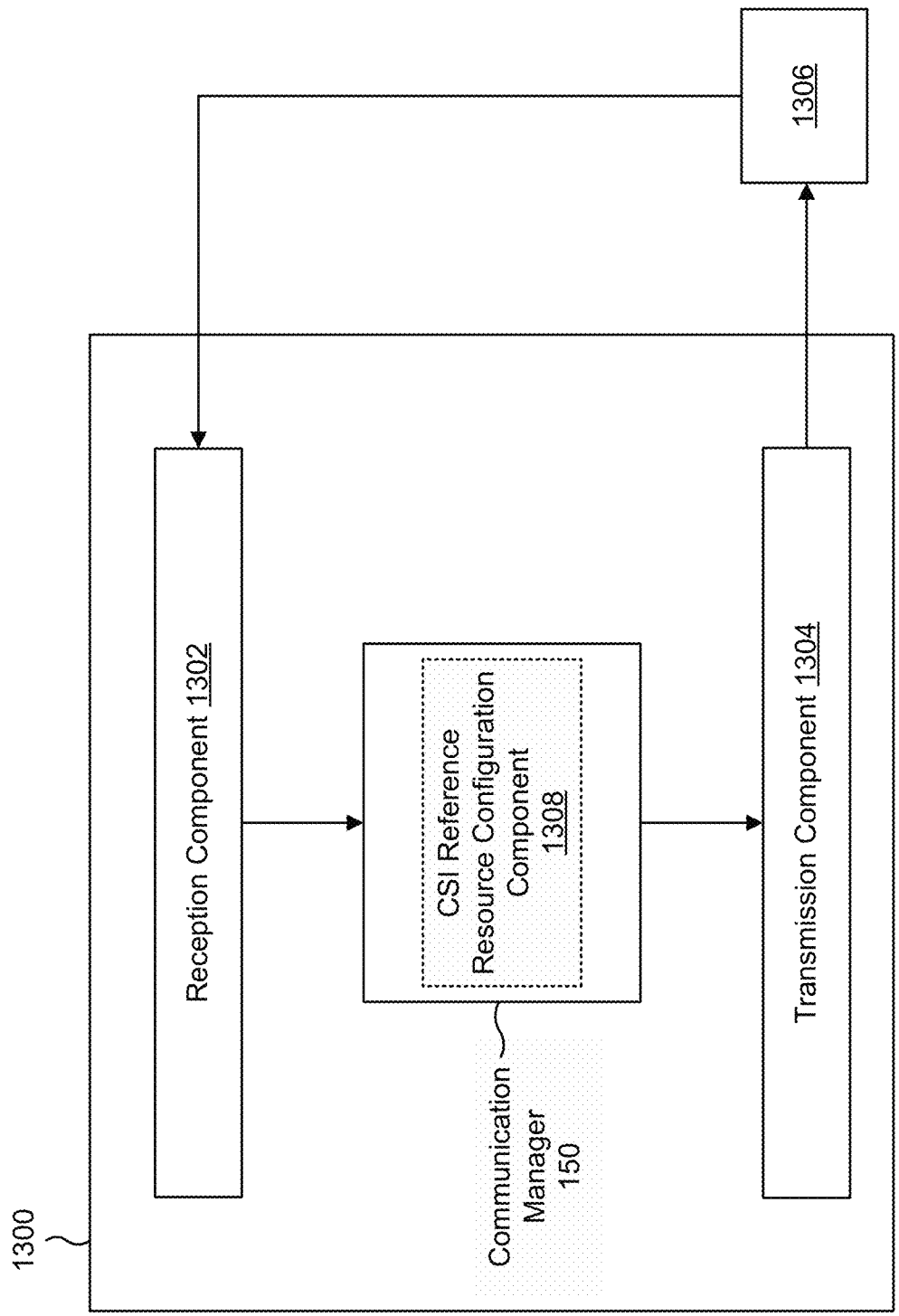

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include a CSI reference resource configuration component 1308, among other examples.

In some aspects, the apparatus 1300 may be configured to perform one or more operations described herein in connection with FIGS. 7-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

The transmission component 1304 may transmit, to a UE, a configuration for a CSI report associated with one or more CSI-RS resources, wherein the CSI report is associated with a duplex mode. The reception component 1302 may receive, from the UE, a CSI report based at least in part on one or more measurements of a CSI reference resource associated with the duplex mode.

The CSI reference resource configuration component 1308 may determine a bandwidth of the CSI reference resource based at least in part on the duplex mode associated with the CSI report.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a UE, comprising: receiving, from a network node, a configuration for a CSI report associated with one or more CSI-RS resources; determining a duplex mode associated with the CSI report; obtaining one or more measurements of a CSI reference resource of the one or more CSI-RS resources based at least in part on the duplex mode associated with the CSI report; and transmitting, to the network node, the CSI report based at least in part on the one or more measurements of the CSI reference resource.

Aspect 2: The method of Aspect 1, wherein the duplex mode associated with the CSI report is determined based at least in part on a frequency domain resource allocation of the one or more CSI-RS resources associated with the CSI report.

Aspect 3: The method of Aspect 2, wherein the duplex mode is determined as full-duplex based at least in part on the one or more CSI-RS resources having a non-contiguous frequency domain resource allocation.

Aspect 4: The method of Aspect 2, wherein the duplex mode is determined as half-duplex based at least in part on the one or more CSI-RS resources having a contiguous frequency domain resource allocation.

Aspect 5: The method of Aspect 1, wherein the duplex mode associated with the CSI report is indicated in the configuration for the CSI report or in a DCI received by the UE, the DCI triggering transmission of the CSI report.

Aspect 6: The method of Aspect 4, wherein the configuration for the CSI report or the DCI triggering transmission of the CSI report includes a binary indication of a half-duplex mode or a full-duplex mode for the CSI report.

Aspect 7: The method of Aspect 4, wherein the configuration for the CSI report or the DCI triggering transmission of the CSI report indicates the duplex mode for the CSI report according to a contiguous or non-contiguous bandwidth for CSI derivation.

Aspect 8: The method of any of Aspects 1-7, further comprising: determining a bandwidth of the CSI reference resource based at least in part on the duplex mode associated with the CSI report.

Aspect 9: The method of Aspect 8, wherein the bandwidth of the CSI reference resource is determined as contiguous based at least in part on the duplex mode associated with the CSI report being half-duplex.

Aspect 10: The method of Aspect 8, wherein the bandwidth of the CSI reference resource is determined as non-contiguous based at least in part on the duplex mode associated with the CSI report being full-duplex.

Aspect 11: The method of any of Aspects 1-10, wherein the CSI reference resource includes one or more REs allocated to ZP-CSI-RS resources based at least in part on the duplex mode associated with the CSI report being full-duplex.

Aspect 12: The method of Aspect 11, wherein a number of the one or more REs allocated to the ZP-CSI-RS resources has a fixed value.

Aspect 13: The method of Aspect 11, wherein a number of the one or more REs allocated to the ZP-CSI-RS resources is based at least in part on a fixed split between uplink and downlink resources.

Aspect 14: The method of Aspect 11, wherein a number of the one or more REs allocated to the ZP-CSI-RS resources is based at least in part on the configuration for the CSI report.

Aspect 15: A method of wireless communication performed by a network node, comprising: transmitting, to a UE, a configuration for a CSI report associated with one or more CSI-RS resources, wherein the CSI report is associated with a duplex mode; and receiving, from the UE, a CSI report based at least in part on one or more measurements of a CSI reference resource associated with the duplex mode.

Aspect 16: The method of Aspect 15, wherein the duplex mode associated with the CSI report is determined based at least in part on a frequency domain resource allocation of the one or more CSI-RS resources associated with the CSI report.

Aspect 17: The method of Aspect 16, wherein the duplex mode is determined as full-duplex based at least in part on the one or more CSI-RS resources having a non-contiguous frequency domain resource allocation.

Aspect 18: The method of Aspect 16, wherein the duplex mode is determined as half-duplex based at least in part on the one or more CSI-RS resources having a contiguous frequency domain resource allocation.

Aspect 19: The method of Aspect 15, wherein the duplex mode associated with the CSI report is indicated in the configuration for the CSI report or in a DCI transmitted to the UE, the DCI triggering transmission of the CSI report.

Aspect 20: The method of Aspect 19, wherein the configuration for the CSI report or the DCI triggering transmission of the CSI report includes a binary indication of a half-duplex mode or a full-duplex mode for the CSI report.

Aspect 21: The method of Aspect 19, wherein the configuration for the CSI report or the DCI triggering transmission of the CSI report indicates the duplex mode for the CSI report according to a contiguous or non-contiguous bandwidth for CSI derivation.

Aspect 22: The method of any of Aspects 15-21, further comprising: determining a bandwidth of the CSI reference resource based at least in part on the duplex mode associated with the CSI report.

Aspect 23: The method of Aspect 22, wherein the bandwidth of the CSI reference resource is determined as contiguous based at least in part on the duplex mode associated with the CSI report being half-duplex.

Aspect 24: The method of Aspect 22, wherein the bandwidth of the CSI reference resource is determined as non-contiguous based at least in part on the duplex mode associated with the CSI report being full-duplex.

Aspect 25: The method of any of Aspects 15-24, wherein the CSI reference resource includes one or more REs allocated to ZP-CSI-RS resources based at least in part on the duplex mode associated with the CSI report being full-duplex.

Aspect 26: The method of Aspect 25, wherein a number of the one or more REs allocated to the ZP-CSI-RS resources has a fixed value.

Aspect 27: The method of Aspect 25, wherein a number of the one or more REs allocated to the ZP-CSI-RS resources is based at least in part on a fixed split between uplink and downlink resources.

Aspect 28: The method of Aspect 25, wherein a number of the one or more REs allocated to the ZP-CSI-RS resources is based at least in part on the configuration for the CSI report.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a network node, a configuration for a channel state information (CSI) report associated with one or more CSI reference signal (CSI-RS) resources;
   determining a duplex mode associated with the CSI report;
   obtaining one or more measurements of a CSI reference resource of the one or more CSI-RS resources based at least in part on the duplex mode associated with the CSI report, wherein the duplex mode is half-duplex or full duplex; and
   transmitting, to the network node, the CSI report based at least in part on the one or more measurements of the CSI reference resource.

2. The method of claim 1, wherein the duplex mode associated with the CSI report is determined based at least in part on a frequency domain resource allocation of the one or more CSI-RS resources associated with the CSI report.

3. The method of claim 2, wherein the duplex mode is determined as full-duplex based at least in part on the one or more CSI-RS resources having a non-contiguous frequency domain resource allocation.

4. The method of claim 2, wherein the duplex mode is determined as half-duplex based at least in part on the one or more CSI-RS resources having a contiguous frequency domain resource allocation.

5. The method of claim 1, wherein the duplex mode associated with the CSI report is indicated in the configuration for the CSI report or in a downlink control information (DCI) received by the UE, the DCI triggering transmission of the CSI report.

6. The method of claim 5, wherein the configuration for the CSI report or the DCI triggering transmission of the CSI report includes a binary indication of a half-duplex mode or a full-duplex mode for the CSI report.

7. The method of claim 5, wherein the configuration for the CSI report or the DCI triggering transmission of the CSI report indicates the duplex mode for the CSI report according to a contiguous or non-contiguous bandwidth for CSI derivation.

8. The method of claim 1, further comprising:
   determining a bandwidth of the CSI reference resource based at least in part on the duplex mode associated with the CSI report.

9. The method of claim 8, wherein the bandwidth of the CSI reference resource is determined as contiguous based at least in part on the duplex mode associated with the CSI report being half-duplex.

10. The method of claim 8, wherein the bandwidth of the CSI reference resource is determined as non-contiguous based at least in part on the duplex mode associated with the CSI report being full-duplex.

11. The method of claim 1, wherein the CSI reference resource includes one or more resource elements (REs)

allocated to zero power (ZP)-CSI-RS resources based at least in part on the duplex mode associated with the CSI report being full-duplex.

12. The method of claim 11, wherein a number of the one or more REs allocated to the ZP-CSI-RS resources has a fixed value.

13. The method of claim 11, wherein a number of the one or more REs allocated to the ZP-CSI-RS resources is based at least in part on a fixed split between uplink and downlink resources.

14. The method of claim 11, wherein a number of the one or more REs allocated to the ZP-CSI-RS resources is based at least in part on the configuration for the CSI report.

15. A method of wireless communication performed by a network node, comprising:
   transmitting, to a user equipment (UE), a configuration for a channel state information (CSI) report associated with one or more CSI reference signal (CSI-RS) resources, wherein the CSI report is associated with a duplex mode, wherein the duplex mode is half-duplex or full duplex; and
   receiving, from the UE, a CSI report based at least in part on one or more measurements of a CSI reference resource associated with the duplex mode.

16. A user equipment (UE) for wireless communication, comprising:
   one or more memories; and
   one or more processors, coupled to the one or more memories, configured to:
      receive, from a network node, a configuration for a channel state information (CSI) report associated with one or more CSI reference signal (CSI-RS) resources;
      determine a duplex mode associated with the CSI report;
      obtain one or more measurements of a CSI reference resource of the one or more CSI-RS resources based at least in part on the duplex mode associated with the CSI report, wherein the duplex mode is half-duplex or full duplex; and
      transmit, to the network node, the CSI report based at least in part on the one or more measurements of the CSI reference resource.

17. The UE of claim 16, wherein the duplex mode associated with the CSI report is determined based at least in part on a frequency domain resource allocation of the one or more CSI-RS resources associated with the CSI report.

18. The UE of claim 17, wherein the duplex mode is determined as full-duplex based at least in part on the one or more CSI-RS resources having a non-contiguous frequency domain resource allocation.

19. The UE of claim 17, wherein the duplex mode is determined as half-duplex based at least in part on the one or more CSI-RS resources having a contiguous frequency domain resource allocation.

20. The UE of claim 16, wherein the duplex mode associated with the CSI report is indicated in the configuration for the CSI report or in a downlink control information (DCI) received by the UE, the DCI triggering transmission of the CSI report.

21. The UE of claim 20, wherein the configuration for the CSI report or the DCI triggering transmission of the CSI report includes a binary indication of a half-duplex mode or a full-duplex mode for the CSI report.

22. The UE of claim 20, wherein the configuration for the CSI report or the DCI triggering transmission of the CSI report indicates the duplex mode for the CSI report according to a contiguous or non-contiguous bandwidth for CSI derivation.

23. The UE of claim 16, wherein the one or more processors are further configured to:
   determine a bandwidth of the CSI reference resource based at least in part on the duplex mode associated with the CSI report.

24. The UE of claim 23, wherein the bandwidth of the CSI reference resource is determined as contiguous based at least in part on the duplex mode associated with the CSI report being half-duplex.

25. The UE of claim 23, wherein the bandwidth of the CSI reference resource is determined as non-contiguous based at least in part on the duplex mode associated with the CSI report being full-duplex.

26. The UE of claim 16, wherein the CSI reference resource includes one or more resource elements (REs) allocated to zero power (ZP)-CSI-RS resources based at least in part on the duplex mode associated with the CSI report being full-duplex.

27. The UE of claim 26, wherein a number of the one or more REs allocated to the ZP-CSI-RS resources has a fixed value.

28. The UE of claim 26, wherein a number of the one or more REs allocated to the ZP-CSI-RS resources is based at least in part on a fixed split between uplink and downlink resources.

29. The UE of claim 26, wherein a number of the one or more REs allocated to the ZP-CSI-RS resources is based at least in part on the configuration for the CSI report.

30. A network node for wireless communication, comprising:
   one or more memories; and
   one or more processors, coupled to the one or more memories, configured to:
      transmit, to a user equipment (UE), a configuration for a channel state information (CSI) report associated with one or more CSI reference signal (CSI-RS) resources, wherein the CSI report is associated with a duplex mode, wherein the duplex mode is half-duplex or full duplex; and
      receive, from the UE, a CSI report based at least in part on one or more measurements of a CSI reference resource associated with the duplex mode.

* * * * *